(12) United States Patent
Chen

(10) Patent No.: US 9,612,691 B2
(45) Date of Patent: Apr. 4, 2017

(54) INDUCING CAPACITANCE DETECTOR AND CAPACITIVE POSITION DETECTOR OF USING SAME

(75) Inventor: Chung-Chun Chen, Hsinchu (TW)

(73) Assignee: AU OPTRONICS, Hsinchu (TW)

( * ) Notice: Subject to any disclaimer, the term of this patent is extended or adjusted under 35 U.S.C. 154(b) by 2200 days.

(21) Appl. No.: 12/610,589

(22) Filed: Nov. 2, 2009

(65) Prior Publication Data

US 2011/0100728 A1 May 5, 2011

(51) Int. Cl.
*G06F 3/044* (2006.01)
(52) U.S. Cl.
CPC .................................. *G06F 3/044* (2013.01)
(58) Field of Classification Search
USPC ........................................................ 345/174
See application file for complete search history.

(56) References Cited

U.S. PATENT DOCUMENTS

| | | | |
|---|---|---|---|
| 5,841,078 A * | 11/1998 | Miller et al. | 178/18.06 |
| 6,239,788 B1 * | 5/2001 | Nohno et al. | 345/173 |
| 6,466,036 B1 | 10/2002 | Philipp | |
| 6,744,258 B2 | 6/2004 | Ishio et al. | |
| 7,453,270 B2 | 11/2008 | Hargreaves et al. | |
| 7,453,444 B2 | 11/2008 | Geaghan | |
| 2005/0122785 A1 * | 6/2005 | Umeda et al. | 365/187 |
| 2006/0049834 A1 * | 3/2006 | Umeda | 324/658 |
| 2010/0073323 A1 * | 3/2010 | Geaghan | 345/174 |
| 2010/0085344 A1 * | 4/2010 | Ogawa et al. | 345/211 |
| 2010/0110040 A1 * | 5/2010 | Kim et al. | 345/174 |

FOREIGN PATENT DOCUMENTS

WO 2008064500 A2 6/2008

* cited by examiner

*Primary Examiner* — William Boddie
*Assistant Examiner* — Bryan Earles
(74) *Attorney, Agent, or Firm* — Tim Tingkang Xia, Esq.; Locke Lord LLP

(57) ABSTRACT

One aspect of the present invention relates to an inducing capacitance detector. In one embodiment, the inducing capacitance detector has an input terminal for receiving a supply voltage; a capacitive sensor array with a first output terminal and a second output terminal; an operational amplifier having an inventing input terminal electrically connected to the first output terminal of the capacitive sensor array, a non-inventing input terminal electrically connected to the second output terminal of the capacitive sensor array and the input terminal, and an output terminal for outputting an output signal, a feedback capacitor electrically connected between the inventing input terminal and the output terminal of the operational amplifier.

11 Claims, 17 Drawing Sheets

INDUCING CAPACITANCE DETECTOR AND CAPACITIVE POSITION DETECTOR OF USING SAME

FIELD OF THE INVENTION

The present invention relates generally to a position detector, and more particularly, to an inducing capacitance detector and a capacitive position detector of using same.

BACKGROUND OF THE INVENTION

Touch sensing or touch position detection technology capable of providing a natural interface between an electronic system and user has found widespread applications in a variety of fields, for example, in mobile phones, personal digital assistants (PDAs), automatic teller machines (ATMs), game machines, medical devices, liquid crystal display (LCD) devices, light emitting diode (LED) devices, plasma display panel (PDP) devices, computing devices, and the like, where a user may input desired information and/or operate the electronic system through a touch sensing device associated with the electronic system. A touch sensing device typically includes a controller, a sensing circuit having a plurality of touch sensors and a network of control lines electrically connecting the plurality of touch sensors to the controller, and a touch panel associated with the plurality of touch sensors.

There are different types of touch sensing devices available for detection of a touch location. One is a resistive-type touch sensing device that includes two layers of transparent conductive material, such as a transparent conductive oxide, separated by a gap. When touched with sufficient force, one of the conductive layers flexes to make contact with the other conductive layer. The location of the contact point is detectable by a controller that senses the change in resistance at the contact point. In response, the controller performs a function, if any, associated with the contact point.

Another one is a capacitive-type touch sensing device. The capacitive-type touch sensing device can be classified into two types: an analog capacitive sensing device, which uses a contiguous resistive layer, and a projected capacitive sensing device, which uses patterned conductive layers (electrodes).

In a projected capacitive touch device, the touch sensor employs a series of patterned electrodes that are driven with a signal from a controller. Similarly, a location of the contact point can be derived from currents flowing through one or more corresponding electrodes toward the touch point responsive to the touch with sensing the capacitance induced by a user's finger. A finger touch to the sensor provides a capacitive couple from the conductive layer to the body. The location of the contact point is detectable by a controller that measures a change in a capacitively coupled electrical signal at the touch location. Accordingly, the controller performs a function, if any, associated with the touch location.

FIG. 16 shows schematically circuit diagrams of a conventional capacitive position detector. The output signal V(t) of the capacitive position detector has the following form:

$$V(t)=V_C \cdot (1-e^{-t/\tau}), t \geq 0$$

$$\tau = \Sigma_i R_i \cdot C_i, \quad (1)$$

where $V_C$ is a supply voltage; $R_i$ and $C_i$ are resistance and capacitance value of the i-th capacitance sensor of the inducing capacitance detector, respectively. The output signal V(t) is plotted in FIG. 17. The capacitive position detector integrates the detector load and the capacitance of human finger as a compound variable to perform hierarchical signal triggering. Because the output signals for different compound capacitances have different steady-state time, the difference of threshold signals for different compound capacitances can be utilized to perform position detection.

However, for such a configuration of the capacitive position detector, it requires high resolution A/D conversions, which increases the complexity of the circuit of the detector, thereby increasing manufacturing costs. Moreover, if the detector load is much larger than the induced capacitance of a human finger, the sensitivity of the capacitive position detector will be limited. Accordingly, the capacitive position detector is not suitable in the large sized human-machine interface operation.

Therefore, a heretofore unaddressed need exists in the art to address the aforementioned deficiencies and inadequacies.

SUMMARY OF THE INVENTION

In one aspect, the present invention relates to a inducing capacitance detector. In one embodiment, the inducing capacitance detector includes an input for providing a supply voltage, $V_{IN}$, and a capacitive sensor array.

The capacitive sensor array comprises a first sensing output, a second sensing output, a plurality of capacitors, {C(m)}, m=1, 2, ..., M, M being a positive integer, each capacitor C(m) having a first electrode and a second electrode. In one embodiment, each of the plurality of capacitors {C(m)} has a capacitance, $C_S$.

The capacitive sensor array also comprises a plurality of sensor resistors, {$R_S(m)$}, each sensor resistor $R_S(m)$ having a first terminal and a second terminal, where the first and second terminals of the j-th sensor resistor $R_S(j)$ are electrically connected to the first electrodes of the j-th capacitor C(j) and the (j+1)-th capacitor C(j+1), respectively, j=1, 2, ..., (M−1), and the first and second terminals of the M-th sensor resistor $R_S(M)$ are electrically connected to the first electrode of the M-th capacitor C(M) and the first sensing output, respectively. In one embodiment, each of the plurality of the sensor resistors {$R_S(m)$} has a resistance $R_S$.

The capacitive sensor array further comprises a plurality of reference resistors, {$R_{COM}(m)$}, each reference resistor $R_{COM}(m)$ having a first terminal and a second terminal, where the first and second terminals of the j-th reference resistor $R_{COM}(j)$ are electrically connected to the second electrodes of the j-th capacitor C(j) and the (j+1)-th capacitor C(j+1), respectively, and the first and second terminals of the M-th reference resistor $R_{COM}(M)$ are electrically connected to the second electrode of the M-th capacitor C(M) and the second sensing output, respectively. In one embodiment, each of the plurality of reference resistors {$R_{COM}(m)$} has a resistance $R_{COM}$, where $R_S$ and $R_{COM}$ are identical or different.

Furthermore, the inducing capacitance detector includes an operational amplifier having an inverting input terminal electrically coupled to the first sensing output of the capacitive sensor array, and a non-inverting input terminal, and an output terminal, wherein the non-inverting input terminal and the second sensing output of the capacitive sensor array are electrically connected in common to the input, and wherein an output terminal is adapted for outputting an output signal, $V_{OUT}$. The inducing capacitance detector also includes a feedback capacitor $C_T$ is electrically connected between the inventing input terminal and the output terminal of the operational amplifier, and a switch $S_R$ is electrically connected between the inventing input terminal and the output terminal of the operational amplifier.

Additionally, the inducing capacitance detector may include two resistors $R_{P1}$ and $R_{P2}$, where the resistor $R_{P1}$ is electrically connected between the first sensing output of the capacitive sensor array and the inverting input terminal of the operational amplifier, and the resistor $R_{P2}$ is electrically connected between the second sensing output of the capacitive sensor array and the non-inverting input terminal of the operational amplifier, respectively.

In one embodiment, the output signal $V_{OUT}$ at a given time t, $V_{OUT}(t)$, satisfies the following formula:

$$V_{OUT}(t) = \left(1 + \frac{C_F}{C_T}\right) \cdot V_{IN}(t), t \geq 0,$$

where $V_{IN}(t)$ is the supply voltage received from the input, $C_F$ is an inducing capacitance between the capacitive sensing array and an object, and $C_T$ is the capacitance of the feedback capacitor.

In another aspect, the present invention relates to a inducing capacitance detector. In one embodiment, the inducing capacitance detector includes an input for providing a supply voltage, $V_{IN}$, a capacitive sensor array, and a detecting unit.

The capacitive sensor array comprises a first sensing output, a second sensing output, a plurality of capacitors, $\{C(m)\}$, m=1, 2, ..., M, M being a positive integer, each capacitor C(m) having a first electrode and a second electrode. In one embodiment, each of the plurality of capacitors $\{C(m)\}$ has a capacitance, $C_S$.

The capacitive sensor array also comprises a plurality of sensor resistors, $\{R_S(m)\}$, each sensor resistor $R_S(m)$ having a first terminal and a second terminal, where the first and second terminals of the j-th sensor resistor $R_S(j)$ are electrically connected to the first electrodes of the j-th capacitor C(j) and the (j+1)-th capacitor C(j+1), respectively, j=1, 2, ..., (M−1), and the first and second terminals of the M-th sensor resistor $R_S(M)$ are electrically connected to the first electrode of the M-th capacitor C(M) and the first sensing output, respectively. In one embodiment, each of the plurality of the sensor resistors $\{R_S(m)\}$ has a resistance $R_S$.

The capacitive sensor array further comprises a plurality of reference resistors, $\{R_{COM}(m)\}$, each reference resistor $R_{COM}(m)$ having a first terminal and a second terminal, where the first and second terminals of the j-th reference resistor $R_{COM}(j)$ are electrically connected to the second electrodes of the j-th capacitor C(j) and the (j+1)-th capacitor C(j+1), respectively, and the first and second terminals of the M-th reference resistor $R_{COM}(M)$ are electrically connected to the second electrode of the M-th capacitor C(M) and the second sensing output, respectively. In one embodiment, each of the plurality of reference resistors $\{R_{COM}(m)\}$ has a resistance $R_{COM}$, where $R_S$ and $R_{COM}$ are identical or different.

The detecting unit has a first detecting input and a second detecting input, wherein the first detecting input is electrically connected to the first sensing output of the capacitive sensor array, and the second detecting input and the second sensing output of the capacitive sensor array are electrically connected in common to the input.

In one embodiment, the detecting unit comprises an operational amplifier having an inverting input terminal electrically coupled to the first detecting input, a non-inverting input terminal electrically coupled to the second detecting input, a first output terminal for outputting a first output signal, $V_{OUTP}$, and a second output terminal for outputting a second output signal, $V_{OUTN}$, a first feedback capacitor $C_{T1}$ is electrically connected between the first detecting input and the first output terminal of the operational amplifier, a second feedback capacitor $C_{T2}$ is electrically connected between the second detecting input and the second output terminal of the operational amplifier, a first switch $S_{R1}$ is electrically connected between electrically connected between the first detecting input and the first output terminal of the operational amplifier, and a second switch $S_{R2}$ is electrically connected between electrically connected between the second detecting input and the second output terminal of the operational amplifier. In one embodiment, each of the first feedback capacitor $C_{T1}$ and the second feedback capacitor $C_{T2}$ has a capacitance $C_T$.

The first output signal $V_{OUTP}$ and the second output signal $V_{OUTN}$ are opposite to each other, which respectively satisfy the following formulas:

$$V_{OUTP}(t) = \left(1 + \frac{C_F}{C_T}\right) \cdot V_{IN}(t), t \geq 0$$

$$V_{OUTN}(t) = -\left(1 + \frac{C_F}{C_T}\right) \cdot V_{IN}(t), t \geq 0,$$

where $V_{IN}(t)$ is the supply voltage received from the input, $C_F$ is an inducing capacitance between the capacitive sensing array and an object, and $C_T$ is the capacitance of the first and second feedback capacitors.

In another embodiment, the detecting unit further comprises an additional operational amplifier having an inverting input terminal, a non-inverting input terminal, and an output terminal for outputting an output signal, $V_{OUTT}$, a pair of first resistors $R_1$, one of the pair of first resistors $R_1$ electrically connected between the first output terminal of the operational amplifier and the non-inverting input terminal of the additional operational amplifier, and the other of the pair of first resistor $R_1$ electrically connected between the second output terminal of the operational amplifier and the inverting input terminal of the additional operational amplifier, and a pair of second resistors $R_2$, one of the pair of second resistors $R_2$ electrically connected between the non-inverting input terminal of the additional operational amplifier and a voltage supply, and the other of the pair of second resistor $R_2$ electrically connected between the inverting input terminal and the output terminal of the additional operational amplifier.

In one embodiment, the output signal $V_{OUTT}$ at a given time t, $V_{OUTT}(t)$, satisfies the following formula:

$$V_{OUTT}(t) = 2 \cdot \left(1 + \frac{C_F}{C_T}\right) \cdot \frac{R_2}{R_1} \cdot V_{IN}(t), t \geq 0$$

where $V_{IN}(t)$ is the supply voltage received from the input, $C_F$ is an inducing capacitance between the capacitive sensing array and an object, $C_T$ is the capacitance of the first and second feedback capacitors.

In yet another aspect, the present invention relates to a capacitive position detection device comprising a plurality of inducing capacitance detectors as disclosed above.

In a further aspect, the present invention relates to a capacitive position detection device.

In one embodiment, the capacitive position detection device has a plurality of sensor loading models, $\{S(m, n)\}$, m=1, 2, ..., M, n=1, 2, ..., N, each of M and N being an positive integer, spatially arranged in the form of matrix having M rows and N columns.

Each sensor loading model S(m, n) comprises:
(i) first, second, third and fourth X-axis terminals, $X_1(m)$, $X_2(m)$, $X_3(m)$ and $X_4(m)$;
(ii) first, second, third and fourth four Y-axis terminals, $Y_1(n)$, $Y_2(n)$, $Y_3(n)$ and $Y_4(n)$;
(iii) an X-axis sensor resistor, $R_X$, electrically connected between the first and third X-axis terminals $X_1(m)$ and $X_3(m)$;
(iv) an X-axis VCOM resistor, $R_{XCOM}$, electrically connected between the second and fourth X-axis terminals $X_2(m)$ and $X_4(m)$;
(v) a Y-axis sensor resistor, $R_Y$, electrically connected between the first and third Y-axis terminals $Y_1(n)$ and $Y_3(n)$;
(vi) a Y-axis VCOM resistor, $R_{YCOM}$, electrically connected between the second and fourth Y-axis terminals $Y_2(n)$ and $Y_4(n)$;
(vii) an X-axis capacitor, $C_X$, electrically connected between the first and second X-axis terminals $X_1(m)$ and $X_2(m)$;
(viii) a Y-axis capacitor, $C_Y$, electrically connected between the third and fourth Y-axis terminals $Y_3(n)$ and $Y_4(n)$; and
(ix) a X-Y-axis cross capacitor, $C_{XY}$, electrically connected between the first Y-axis terminal $Y_1(n)$ and the second X-axis terminal $X_2(m)$.

For the n-th column, the first and second X-axis terminals $X_1(j+1)$ and $X_2(j+1)$ of the (j+1)-th row sensor loading model S(j+1, n) are electrically connected to the third and fourth X-axis terminals $X_3(j)$ and $X_4(j)$ of the j-th row sensor loading model S(j, n), j=1, 2, ..., (M−1). For the m-th row, the first and second Y-axis terminals $Y_1(k+1)$ and $Y_2(k+1)$ of the (k+1)-th column sensor loading model S(m, k+1) are electrically connected to the third and fourth Y-axis terminals $Y_3(k)$ and $Y_4(k)$ of the k-th column sensor loading model S(m, k), k=1, 2, ..., (N−1).

The capacitive position detection device further has M X-axis detecting units, $\{D_X(m)\}$, m=1, 2, ..., M, each X-axis detecting unit $D_X(m)$ having first and second detecting inputs electrically connected to the third and fourth Y-axis terminals $Y_3(N)$ and $Y_4(N)$ of the m-th row and N-th column sensor loading model S(m, N), respectively, and N Y-axis detecting units, $\{D_Y(n)\}$, n=1, 2, ..., N, each Y-axis detecting unit $D_Y(n)$ having first and second detecting inputs electrically connected to the third and fourth X-axis terminals $X_3(M)$ and $X_4(M)$ of the M-th row and n-th column sensor loading model S(M, n), respectively. Each X-axis detecting unit $D_X(m)$ and each Y-axis detecting unit $D_Y(n)$ are identical to each other.

In one embodiment, each X-axis detecting unit $D_X(m)$ comprises an operational amplifier having an inverting input terminal electrically coupled to the first detecting input, a non-inverting input terminal electrically coupled to the second detecting input and an output terminal for outputting an output signal, and a feedback capacitor $C_T$ is electrically connected between the first detecting input and the output terminal of the operational amplifier. In one embodiment, the operational amplifier has a third input terminal electrically connected to a supply voltage Further, each X-axis detecting unit $D_X(m)$ comprises two resistors $R_{P1}$ and $R_{P2}$, where the resistor $R_{P1}$ is electrically connected between the first detecting input and the inverting input terminal of the operational amplifier, and the resistor $R_{P2}$ is electrically connected between the second detecting input and the non-inverting input terminal of the operational amplifier, respectively.

In another embodiment, each X-axis detecting unit $D_X(m)$ comprises an operational amplifier having an inverting input terminal electrically coupled to the first detecting input, a non-inverting input terminal electrically coupled to the second detecting input, a third input terminal electrically connected to a supply voltage, a first output terminal for outputting a first output signal, and a second output terminal for outputting a second output signal, a first feedback capacitor $C_{T1}$ is electrically connected between the first detecting input and the first output terminal of the operational amplifier, and a second feedback capacitor $C_{T2}$ is electrically connected between the second detecting input and the second output terminal of the operational amplifier. Each of the first feedback capacitor $C_{T1}$ and the second feedback capacitor $C_{T2}$ has a capacitance $C_T$. Each X-axis detecting unit $D_X(m)$ further comprises two resistors $R_{P1}$ and $R_{P2}$, where the resistor $R_{P1}$ is electrically connected between the first detecting input and the inverting input terminal of the operational amplifier, and the resistor $R_{P2}$ is electrically connected between the second detecting input and the non-inverting input terminal of the operational amplifier, respectively.

In one embodiment, the detecting unit further comprises an additional operational amplifier having an inverting input terminal, a non-inverting input terminal, a third input terminal electrically connected to a supply voltage, and an output terminal for outputting an output signal, a pair of first resistors $R_1$, one of the pair of first resistors $R_1$ electrically connected between the first output terminal of the operational amplifier and the non-inverting input terminal of the additional operational amplifier, and the other of the pair of first resistor $R_1$ electrically connected between the second output terminal of the operational amplifier and the inverting input terminal of the additional operational amplifier, and a pair of second resistors $R_2$, one of the pair of second resistors $R_2$ electrically connected between the non-inverting input terminal of the additional operational amplifier and a voltage supply, and the other of the pair of second resistor $R_2$ electrically connected between the inverting input terminal and the output terminal of the additional operational amplifier. Furthermore, the detecting unit comprises a pair of capacitors $C_R$, one of the pair of capacitors $C_R$ electrically connected between the first output terminal of the operational amplifier and the ground, and the other of the pair of capacitors $C_R$ electrically connected between the second output terminal of the operational amplifier and the ground.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
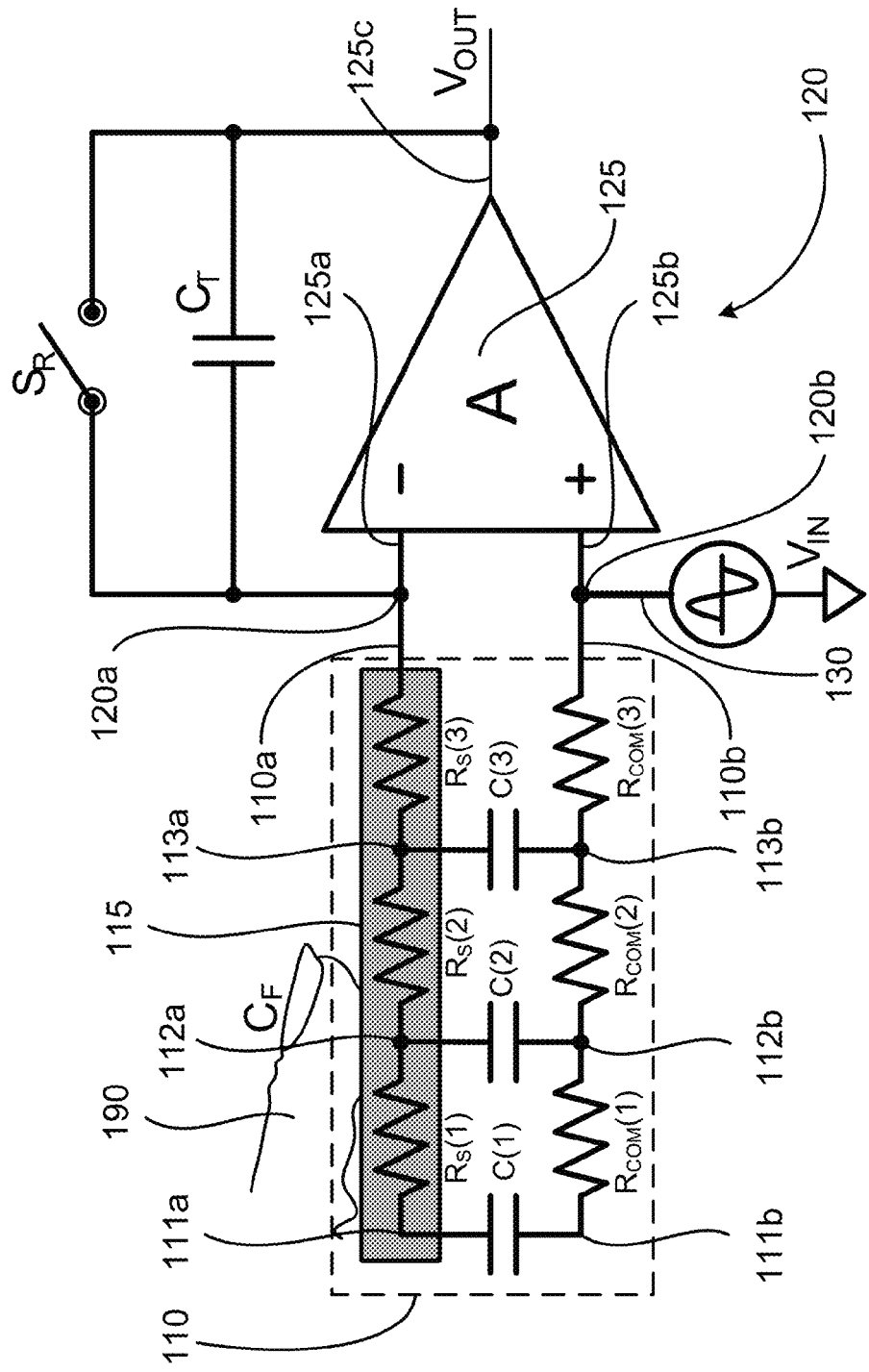
FIG. 1 shows a circuit diagram of an inducing capacitance detector according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, the terms "comprising," "including," "having," "containing," "involving," and the like are to be understood to be open-ended, i.e., to mean including but not limited to.

The description will be made as to the embodiments of the present invention in conjunction with the accompanying drawings of FIGS. 1-15. In accordance with the purposes of this invention, as embodied and broadly described herein, this invention, in one aspect, relates to a capacitive position detector.

Referring now to FIG. 1, an inducing capacitance detector 100 is shown according to one embodiment of the present invention. The inducing capacitance detector 100 includes a capacitive sensor array 110, a detecting unit 120, and an input 130 for providing a supply voltage, $V_{IN}$.

The capacitive sensor array 110 has a first sensing output 110a, a second sensing output 110b, a plurality of capacitors, $\{C(m)\}$, a plurality of sensor resistors, $\{R_S(m)\}$, and a plurality of reference resistors, $\{R_{COM}(m)\}$, m=1, 2, ..., M. The plurality of capacitors $\{C(m)\}$, the plurality of sensor resistors $\{R_S(m)\}$ and the plurality of reference resistors $\{R_{COM}(m)\}$ are electrically coupled to each other for sensing a position of an object (e.g., finger) 190 in contact with the capacitive sensor array 110. For the purpose of illustration of the present invention, M=3 is chosen in this exemplary embodiment. It is obvious that any number of capacitors can be utilized to practice the present invention.

As shown in FIG. 1, each capacitor C(1), C(2) or C(3) has a first electrode 111a, 112a or 113a and a second electrode 111b, 112b or 113b, defining a capacitance, $C_S$, therebetween. Each capacitor C(1), C(2) or C(3) is adapted for individually sensing a contact of an object 190 on the first electrode 111a, 112a or 113a.

Each sensor resistor $R_S(1)$, $R_S(2)$ or $R_S(3)$ has a first terminal and a second terminal. In the configuration shown in FIG. 1, the first and second terminals of the first sensor resistor $R_S(1)$ are electrically connected to the first electrodes 111a and 112a of the first capacitor C(1) and the second capacitor C(2), respectively; the first and second terminals of the second sensor resistor $R_S(2)$ are electrically connected to the first electrodes 112a and 113a of the second capacitor C(2) and the third capacitor C(3), respectively; and the first and second terminals of the third sensor resistor $R_S(3)$ are electrically connected to the first electrode of the third capacitor C(3) and the first sensing output 110a, respectively. In this exemplary embodiment, each sensor resistor $R_S(1)$, $R_S(2)$ or $R_S(3)$ has a resistance $R_S$.

Additionally, each reference resistor $R_{COM}(1)$, $R_{COM}(2)$ or $R_{COM}(3)$ has a first terminal and a second terminal. The first and second terminals of the first reference resistor $R_{COM}(1)$ are electrically connected to the second electrodes 111b and 112b of the first capacitor C(1) and the second capacitor C(2), respectively; the first and second terminals of the second reference resistor $R_{COM}(2)$ are electrically connected to the second electrodes 112b and 113b of the second capacitor C(2) and the third capacitor C(3), respectively; and the first and second terminals of the third reference resistor $R_{COM}(3)$ are electrically connected to the second electrode 113b of the third capacitor C(3) and the second sensing output 110b, respectively. In this embodiment, each second resistor $R_{COM}(1)$, $R_{COM}(2)$ or $R_{COM}(3)$ has a resistance $R_{COM}$. The second resistors $R_{COM}(1)$, $R_{COM}(2)$ or $R_{COM}(3)$ are usually VCOM resistors. $R_S$ and $R_{COM}$ can be identical or different.

The detecting unit 120 has a first detecting input 120a electrically connected to the first sensing output 110a of the capacitive sensor array 110 and a second detecting input 120b. The second detecting input 120b and the second sensing output 110b of the capacitive sensor array 110 are electrically connected in common to the input 130. The detecting unit 120 also includes an operational amplifier 125, a feedback capacitor $C_T$ and a switch $S_R$.

The operational amplifier 125 is a single-ended operational amplifier having an inverting input terminal 125a and a non-inverting input terminal 125b electrically coupled to the first detecting input 120a and the second detecting input 120b of the detecting unit 120, and an output terminal 125c for outputting an output signal, $V_{OUT}$. The feedback capacitor $C_T$ is electrically connected between the first detecting input 120a of the detecting unit 120 and the output terminal 125c of the operational amplifier 125. The switch $S_R$ is also electrically connected between the first detecting input 120a of the detecting unit 120 and the output terminal 125c of the operational amplifier 125. When the switch $S_R$ is turned on, the output signal $V_{OUT}$ is same as the output from the first output terminal 110a of the capacitive sensor array 110. However, when the switch $S_R$ is turned off, the output signal $V_{OUT}$ is an amplified signal of the output from the first output terminal 110a of the capacitive sensor array 110, by the operational amplifier 125.

The detecting unit 120 may also have two resistors $R_{P1}$ and $R_{P2}$ (not shown). The resistor $R_{P1}$ is electrically connected between the first detecting input 120a of the detecting unit 120 and the inverting input terminal 125a of the operational amplifier 125, while the resistor $R_{P2}$ is electrically connected between the second detecting input 120b of the detecting unit 120 and the non-inverting input terminal 125b of the operational amplifier 125, respectively.

For such a configuration, when the finger 190 or the like touches with the first end 115 of the capacitive sensor array 110, electronic charges are induced therein. The charges are conducted to the inventing terminal 125a of the operational amplifier 125 through the first end 115 of the capacitive sensor array 110. The contact can be detected through the change of the output signal $V_{OUT}$ at the output terminal 125c of the operational amplifier 125. The output signal $V_{OUT}$ at a given time t, $V_{OUT}(t)$, is in the form of:

$$V_{OUT}(t) = \left(1 + \frac{C_F}{C_T}\right) \cdot V_{IN}(t), t \geq 0 \quad (2)$$

where $V_{IN}(t)$ is the supply voltage received at the input 130 of the inducing capacitance detector 100; $C_F$ is inducing capacitance between the first end 115 of the capacitive sensor array 110 and the contacted object 190; and $C_T$ is the capacitance of the feedback capacitor $C_T$. From the formula (2), it is clear that the output signal $V_{OUT}$ is a function of $(C_F/C_T)$ and $V_{IN}$, and independent of the capacitance $C_S$ of each capacitor C(1), C(2) or C(3) of the capacitive sensor array 110. Accordingly, the sensitivity of the inducing capacitance detector is improved substantially.

Figure 2:
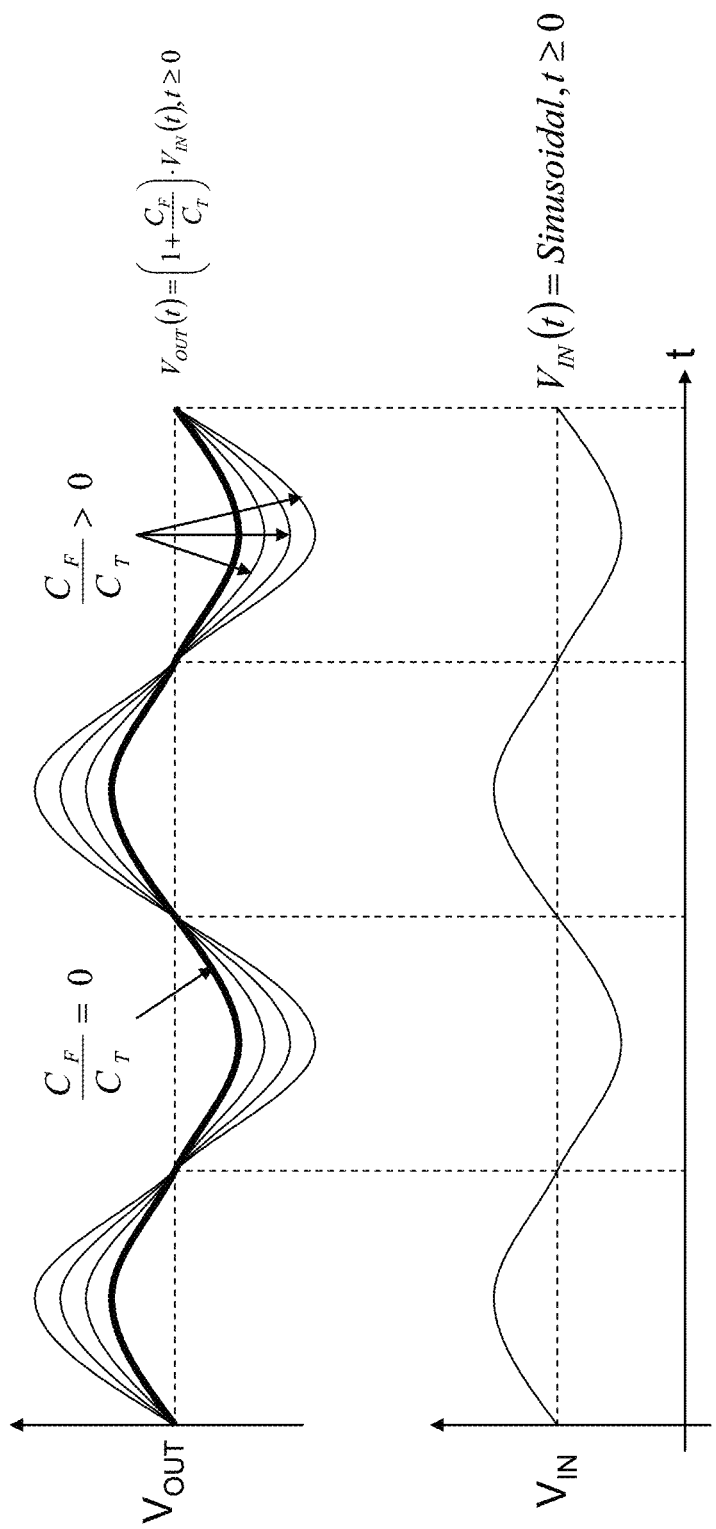
FIG. 2 shows charge conversion waveforms of the output signal $V_{OUT}$ of the inducing capacitance detector shown in FIG. 1 for various capacitances $C_F$ and a sinusoidal waveform of the supply voltage $V_{IN}$.
Figure 3:
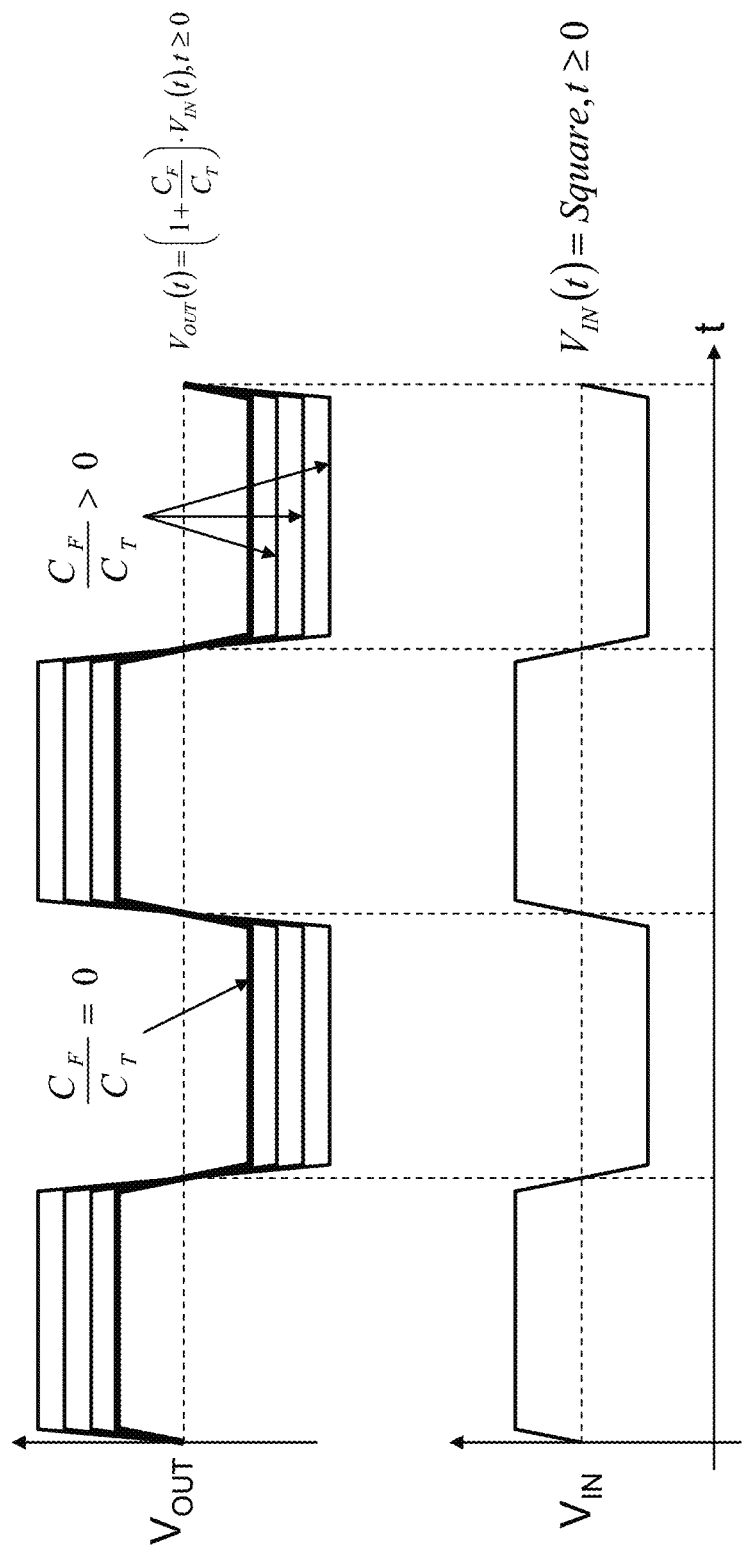
FIG. 3 shows charge conversion waveforms of the output signal $V_{OUT}$ of the inducing capacitance detector shown in FIG. 1 for various capacitances $C_F$ and a square waveform of the supply voltage $V_{IN}$.

FIG. 2 and FIG. 3 show charge conversion waveforms of the output signal $V_{OUT}$ of the inducing capacitance detector 100 illustrated in FIG. 1 for various capacitances $C_F$ induced by the finger touch and different waveforms of the supply voltage $V_{IN}$, a sinusoidal waveform (FIG. 2) and a square waveform (FIG. 3), respectively. The resulting waveforms satisfy the formula (2). If no contact is detected (i.e. $C_F$=0), the waveform of the output signal $V_{OUT}$ is the same as that of the supply voltage $V_{IN}$. However, if there is a contact of an object 190 with the inducing capacitance detector 100, the waveform of the output signal $V_{OUT}$ is $(1+C_F/C_T)$ times of the supply voltage $V_{IN}$. Accordingly, the larger the inducing capacitance $C_F$ is, the larger the difference between the maximal and minimal values of the waveform of the output signal $V_{OUT}$ is. Various waveforms/types of the supply voltage $V_{IN}$ can also be utilized to practice the present invention.

Table 1 lists the measurement results of the output signal $V_{OUT}$ output from the inducing capacitance detector 100, as shown in FIG. 1, for various capacitances. The output signal $V_{OUT}$ is measured with different capacitance values of $C_S$, $C_F$ and $C_T$. With fixed $C_F$ and $C_T$, the measured values of the output signal $V_{OUT}$ are approximate to the ideal values, which are independent of the value of $C_S$.

TABLE 1 measurements of the output signal $V_{OUT}$ output from the inducing capacitance detector for various capacitance values of $C_S$, $C_F$ and $C_T$.

| | $V_{OUT}$ | | | | | | | | | | | |
|---|---|---|---|---|---|---|---|---|---|---|---|---|
| | $C_T$ = 33 pF | | | | $C_T$ = 22 pF | | | | $C_T$ = 10 pF | | | |
| | | | | | $C_S$ | | | | | | | |
| $C_F$ | Ideal Value | 0.0 pF | 22 pF | 100 pF | Ideal Value | 0.0 pF | 22 pF | 100 pF | Ideal Value | 0.0 pF | 22 pF | 100 pF |
| 0.0 pF | 1.0 V | 1.086 | 0.969 | 1.050 | 1.0 V | 1.121 | 1.164 | 1.053 | 1.0 V | 1.315 | 1.377 | 1.432 |
| 3.3 pF | 1.1 V | 1.180 | 1.079 | 1.176 | 1.15 V | 1.268 | 1.281 | 1.225 | 1.33 V | 1.641 | 1.603 | 1.679 |
| 10 pF | 1.30 V | 1.370 | 1.235 | 1.402 | 1.45 V | 1.548 | 1.563 | 1.541 | 2 V | 2.276 | 2.303 | 2.265 |
| 22 pF | 1.67 V | 1.750 | 1.593 | 1.768 | 2 V | 2.102 | 2.082 | 2.108 | 3.2 V | 3.582 | 3.500 | 3.576 |
| 33 pF | 2 V | 2.036 | 1.906 | 2.122 | 2.5 V | 2.569 | 2.504 | 2.472 | 4.3 V | 4.688 | 4.520 | 4.565 |

Figure 4:
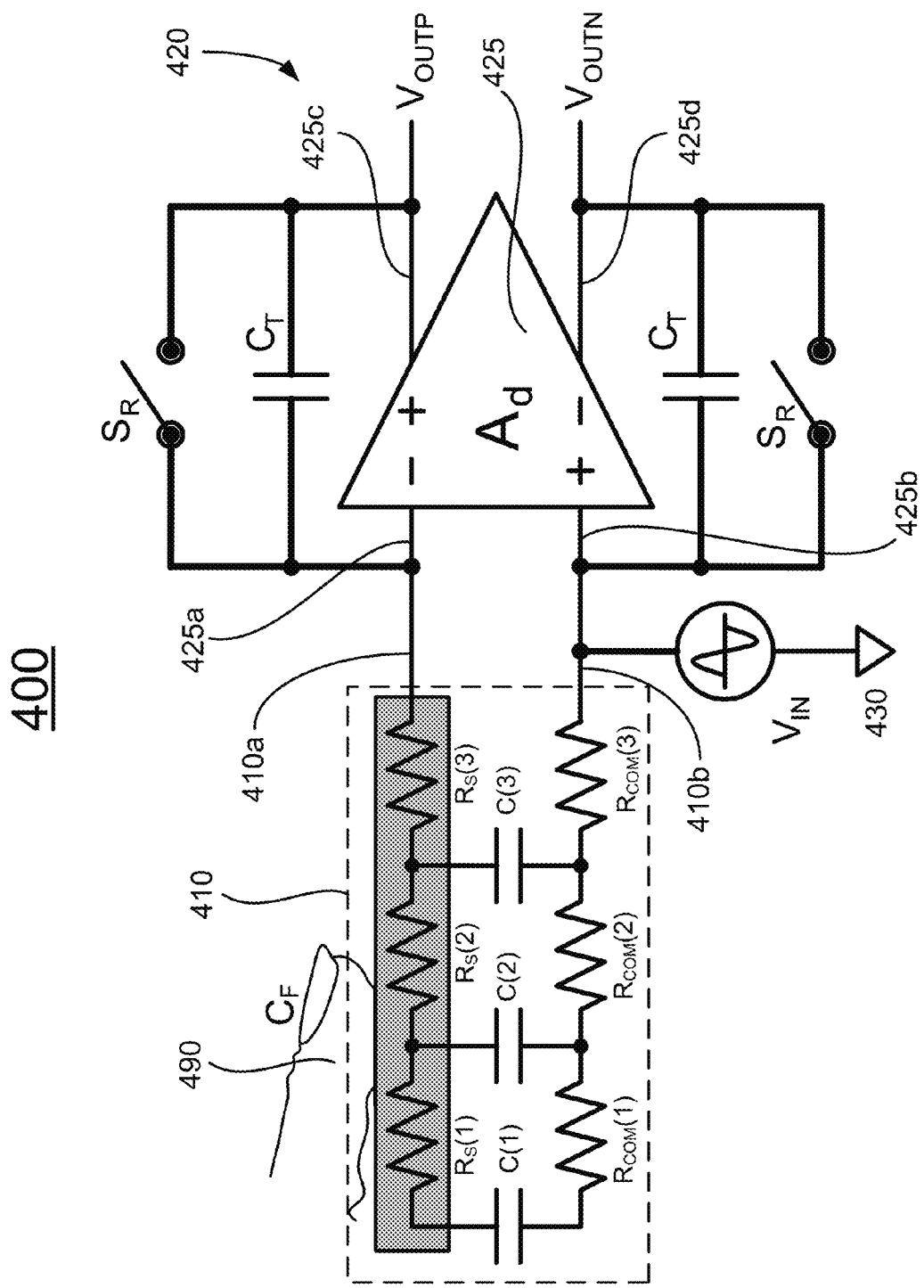
FIG. 4 shows a circuit diagram of an inducing capacitance detector according to another embodiment of the present invention.

Referring now to FIG. 4, an inducing capacitance detector 400 is shown according to another embodiment of the present invention. The inducing capacitance detector 400 includes a capacitive sensor array 410, a detecting unit 420, and an input 430 for providing a supply voltage, $V_{IN}$.

The capacitive sensor array 410 has the same configuration as that of capacitive sensor array 110 shown in FIG. 1, and has a first sensing output 410a, a second sensing output 410b, a plurality of capacitors, {C(m)}, a plurality of sensor resistors, {$R_S$(m)}, and a plurality of reference resistors, {$R_{COM}$(m)}, m=1, 2, . . . , M. The plurality of capacitors {C(m)}, the plurality of sensor resistors {$R_S$(m)} and the plurality of reference resistors {$R_{COM}$(m)} are electrically coupled to each other for sensing a position of an object (e.g., finger) 490 in contact with the capacitive sensor array 410. In this exemplary embodiment, M=3 is chosen.

The detecting unit 420 includes a two-ended operational amplifier 125, two feedback capacitors $C_T$, and two switches $S_R$.

The two-ended operational amplifier 425 has an inverting input terminal 425a electrically coupled to the first sensing output 410a of the capacitive sensor array 410, a non-inverting input terminal 425b electrically coupled to the second sensing output 410b of the capacitive sensor array 410, a first output terminal 425c for outputting a first output signal, $V_{OUTP}$, and a second output terminal 425b for outputting a second output signal, $V_{OUTN}$. The two-ended operational amplifier 125 is a fully differential operational amplifier. One feedback capacitor $C_T$ is electrically connected between inverting input terminal 425a and the first output terminal 425c of the operational amplifier 425, while the other feedback capacitor $C_T$ is electrically connected between the non-inverting input terminal 425b and the second output terminal 425d of the operational amplifier 425. One switch $S_R$ is electrically connected between inverting input terminal 425a and the first output terminal 425c of the operational amplifier 425, while the other switch $S_R$ is electrically connected between the non-inverting input terminal 425b and the second output terminal 425d of the operational amplifier 425.

For such a configuration, when the finger 490 or the like touches on the first end 415 of the capacitive sensor array 410, electronic charges are induced therein. The charges are conducted to the inventing terminal 425a of the operational amplifier 425 through the first end 415 of the capacitive sensor array 410. The contact can be detected through the changes of the first output signal $V_{OuT}$ at the first output terminal 425c and the second output signal $V_{OUT}$ at the second output terminal 425d of the operational amplifier 425. The first output signal $V_{OUTP}$ and the second output signal $V_{OUTN}$ are respectively satisfy the following formulas:

$$V_{OUTP}(t) = \left(1 + \frac{C_F}{C_T}\right) \cdot V_{IN}(t), t \geq 0 \quad (3)$$

$$V_{OUTN}(t) = -\left(1 + \frac{C_F}{C_T}\right) \cdot V_{IN}(t), t \geq 0, \quad (4)$$

where $V_{IN}(t)$ is the supply voltage received from the input 430, $C_F$ is an inducing capacitance between the capacitive sensing array 410 and an object 490, and $C_T$ is the capacitance of the feedback capacitors. From the formulas (3) and (4), it can be seen that the first output signal $V_{OUTP}$ and the second output signal $V_{OUTN}$ are opposite to each other, and are a function of ($C_F/C_T$) and the supply voltage $V_{IN}(t)$, and independent of the capacitance $C_S$ of the capacitor C(1), C(2), or C(3) of the capacitive sensor array 410. Accordingly, the sensitivity of the inducing capacitance detector is improved substantially.

Figure 5:
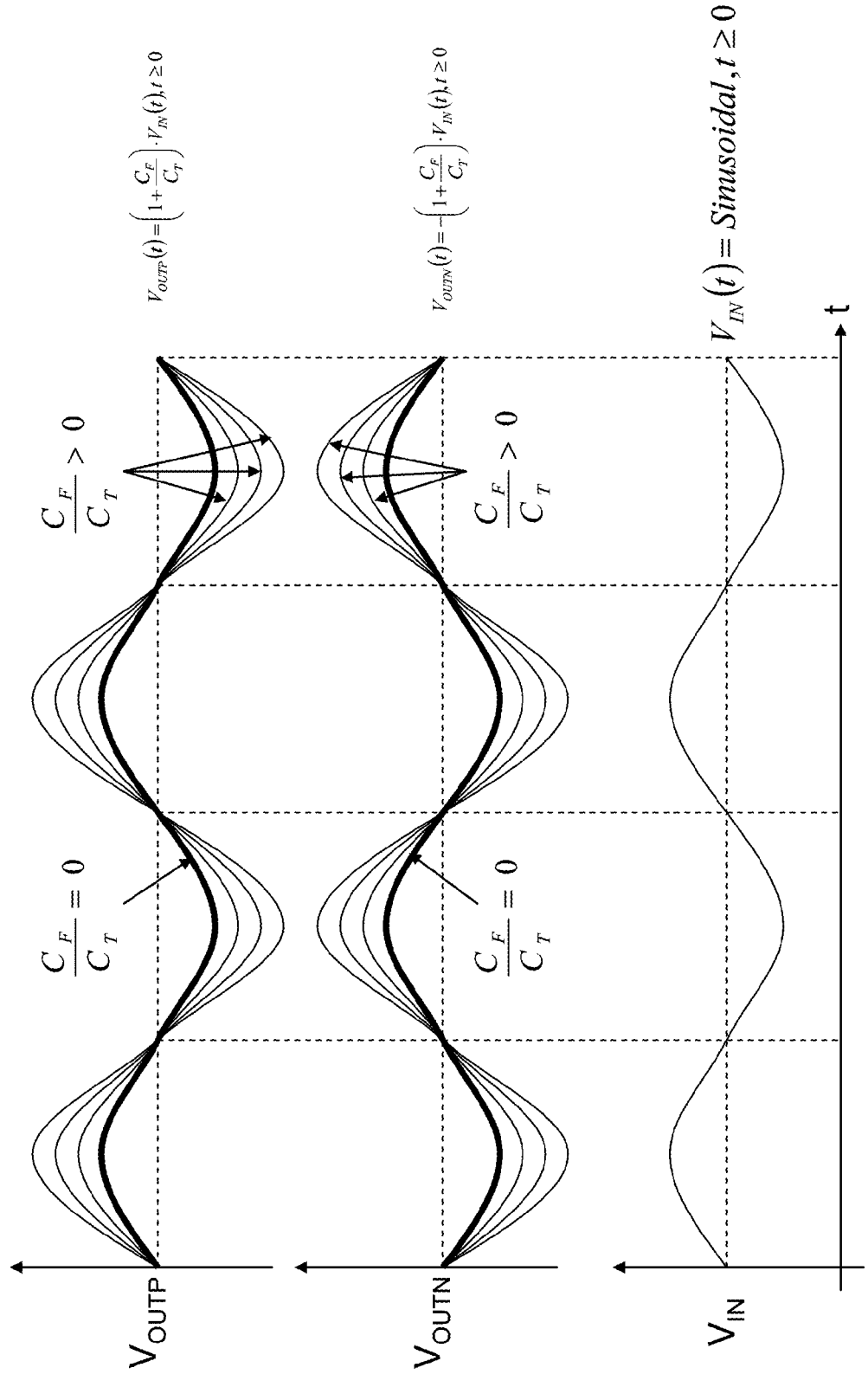
FIG. 5 shows charge conversion waveforms of the first and second output signal $V_{OUTP}$ and $V_{OUTN}$ of the inducing capacitance detector shown in FIG. 3 for various capacitances $C_F$ and a sinusoidal waveform of the supply voltage $V_{IN}$.
Figure 6:
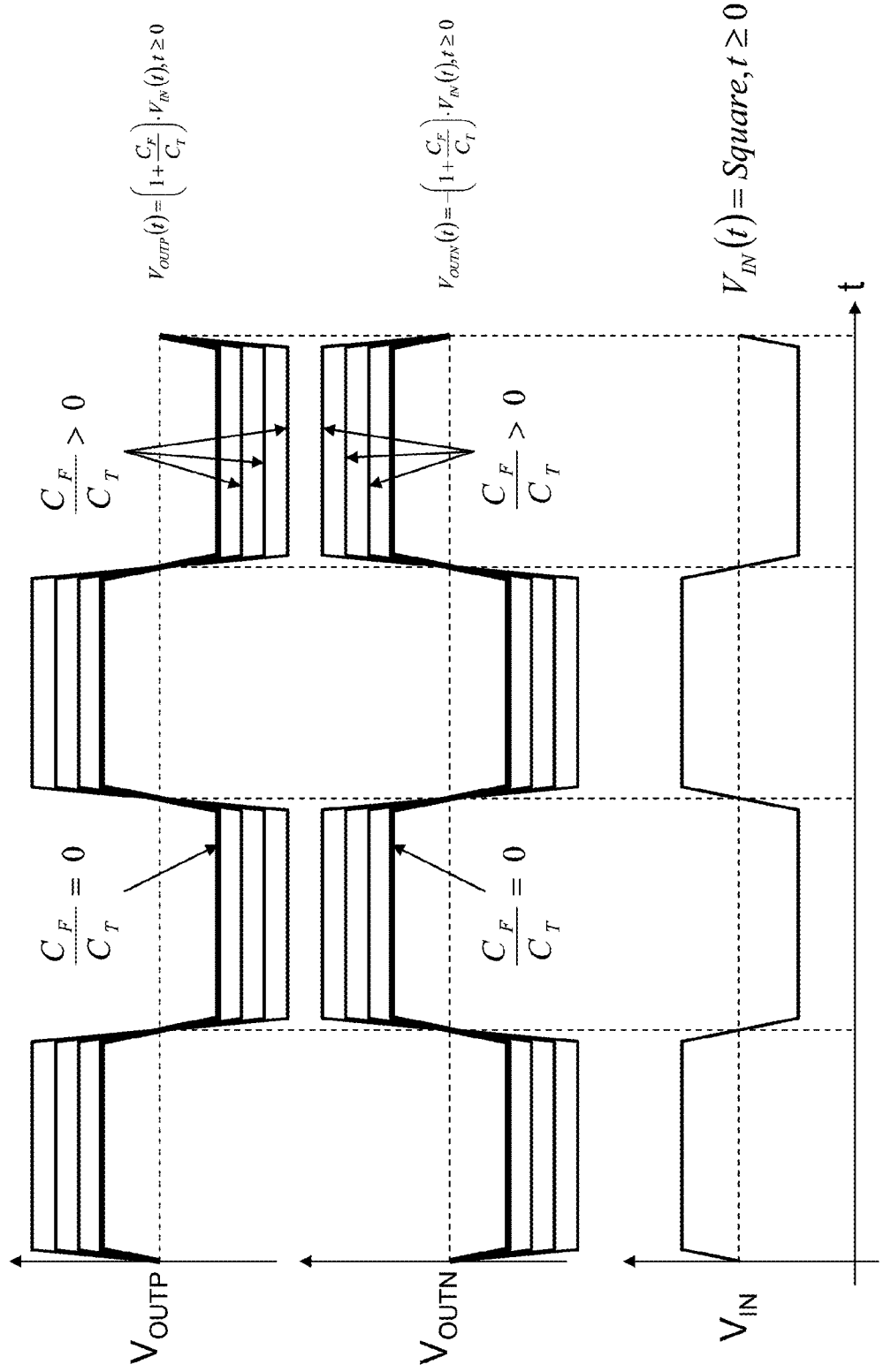
FIG. 6 shows charge conversion waveforms of the first and second output signal $V_{OUTP}$ and $V_{OUTN}$ of the inducing capacitance detector shown in FIG. 3 for various capacitances $C_F$ and a square waveform of the supply voltage $V_{IN}$.

FIG. 5 and FIG. 6 show charge conversion waveforms of the first output signal $V_{OUTP}$ and the second output signal $V_{OUTN}$ of the inducing capacitance detector 400, as shown in FIG. 4, for various capacitances $C_F$ induced by the finger touch and different waveforms of the supply voltage $V_{IN}$, a sinusoidal waveform (FIG. 5) and a square waveform (FIG. 6), respectively. If no contact is detected (i.e. $C_F$=0), the waveforms of each of the first output signal $V_{OUTP}$ and the second output signal $V_{OUTN}$ is the same as that of the supply voltage $V_{IN}$. However, if there is a contact of an object 490 with the inducing capacitance detector 400, the waveform of the first output signal $V_{OUTP}$ is (1+$C_F/C_T$) times of the supply voltage $V_{IN}$, while the waveform of the second output signal $V_{OUTN}$ is −(1+$C_F/C_T$) times of the supply voltage $V_{IN}$. Similarly, the larger the inducing capacitance $C_F$ is, the larger the difference between the maximal and minimal values of the waveform of each of the first output signal $V_{OUTP}$ and the second output signal $V_{OUTN}$ is.

Figure 7:
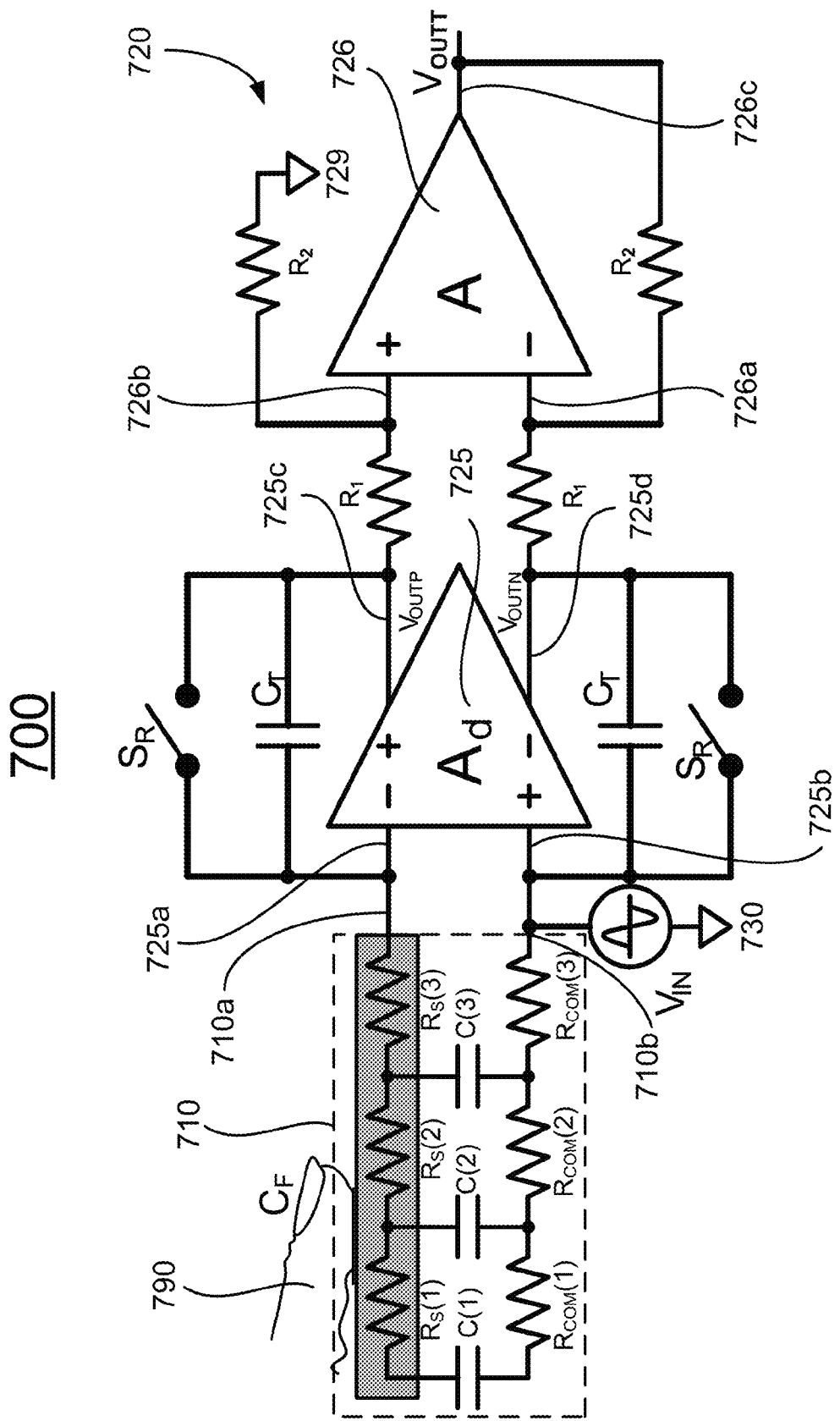
FIG. 7 shows a circuit diagram of an inducing capacitance detector according to one embodiment of the present invention.

FIG. 7 shows an inducing capacitance detector 700 is shown according to yet another embodiment of the present invention. The inducing capacitance detector 700 includes a capacitive sensor array 710, a detecting unit 720, and an input 730 for providing a supply voltage, $V_{IN}$.

The capacitive sensor array 710 has the same configuration as that of capacitive sensor array 410 shown in FIG. 4, and has a first sensing output 710a, a second sensing output 710b, three capacitors, C(1), C(2) and C(3), three sensor resistors, $R_S$(1), $R_S$(2) and $R_S$(3), and three reference resistors, $R_{COM}$(1), $R_{COM}$(2) and $R_{COM}$(3)}, electrically coupled to each other for sensing a position of an object (e.g., finger) 790 in contact with the capacitive sensor array 710.

The detecting unit 720 includes a two-ended operational amplifier 725, a single-ended operational amplifier 726, two feedback capacitors $C_T$, two switches $S_R$, a pair of first resistors $R_1$, and a pair of second resistors $R_2$.

The two-ended operational amplifier 725 has an inverting input terminal 725a electrically coupled to the first sensing output 710a of the capacitive sensor array 710, a non-inverting input terminal 725b electrically coupled to the second sensing output 710b of the capacitive sensor array 710, a first output terminal 725c for outputting a first output signal, $V_{OUTP}$, and a second output terminal 725b for outputting a second output signal, $V_{OUTN}$. The two-ended operational amplifier 125 is a fully differential operational amplifier. One feedback capacitor $C_T$ is electrically connected between inverting input terminal 725a and the first output terminal 725c of the operational amplifier 725, while the other feedback capacitor $C_T$ is electrically connected between the non-inverting input terminal 725b and the second output terminal 725d of the operational amplifier 725. One switch $S_R$ is electrically connected between inverting input terminal 725a and the first output terminal 725c of the operational amplifier 725, while the other switch $S_R$ is electrically connected between the non-inverting input terminal 725b and the second output terminal 725d of the operational amplifier 725.

The single-ended operational amplifier 726 having an inverting input terminal 726a, a non-inverting input terminal 726b, and an output terminal 726c for outputting an output signal, $V_{OUTT}$. One of the pair of first resistors $R_1$ electrically connected between the first output terminal 725c of the two-ended operational amplifier 725 and the non-inverting input terminal 726b of the single-ended operational amplifier 726, while the other of the pair of first resistor $R_1$ electrically connected between the second output terminal 725d of the two-ended operational amplifier 725 and the inverting input terminal 726a of the single-ended operational amplifier 726. Further, one of the pair of second resistors $R_2$ electrically connected between the non-inverting input terminal 726b of the single-ended operational amplifier 726 and a reference voltage supply 729, while the other of the pair of second resistor $R_2$ electrically connected between the inverting input terminal 726a and the output terminal 726c of the single-ended operational amplifier 726.

For this configuration, when the capacitive sensor array 710 is touched by a finger 790, a signal $V_{OUTT}$ is output responsively from the output terminal 726c of the single-ended operational amplifier 726. The output signal $V_{OUTT}$ at a given time t, $V_{OUTT}(t)$, is in the form of:

$$V_{OUTT}(t) = 2 \cdot \left(1 + \frac{C_F}{C_T}\right) \cdot \frac{R_2}{R_1} \cdot V_{IN}(t), t \geq 0 \qquad (6)$$

where $V_{IN}(t)$ is the supply voltage received from the input, $C_F$ is an inducing capacitance between the capacitive sensing array 710 and an object 790, $C_T$ is the capacitance of the feedback capacitors. $R_1$ and $R_2$ are the resistance of the first resistors and the second resistors, respectively. Similarly, the output signal $V_{OUTT}$ is independent of the capacitance $C_S$ of capacitors, C(1), C(2) and C(3).

Figure 8:
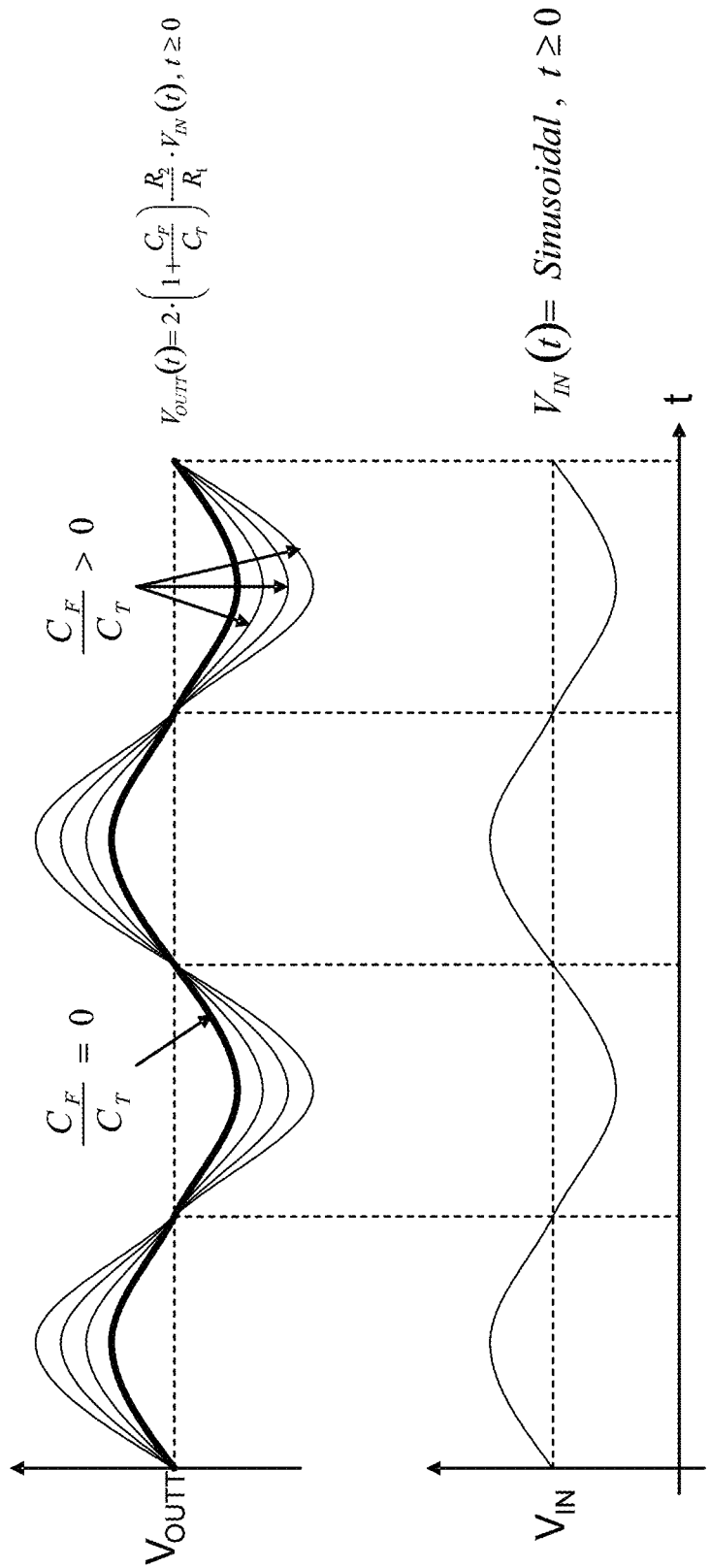
FIG. 8 shows charge conversion waveforms of the output signal $V_{OUTT}$ of the inducing capacitance detector shown in FIG. 7 for various capacitances $C_F$ and a sinusoidal waveform of the supply voltage $V_{IN}$.
Figure 9:
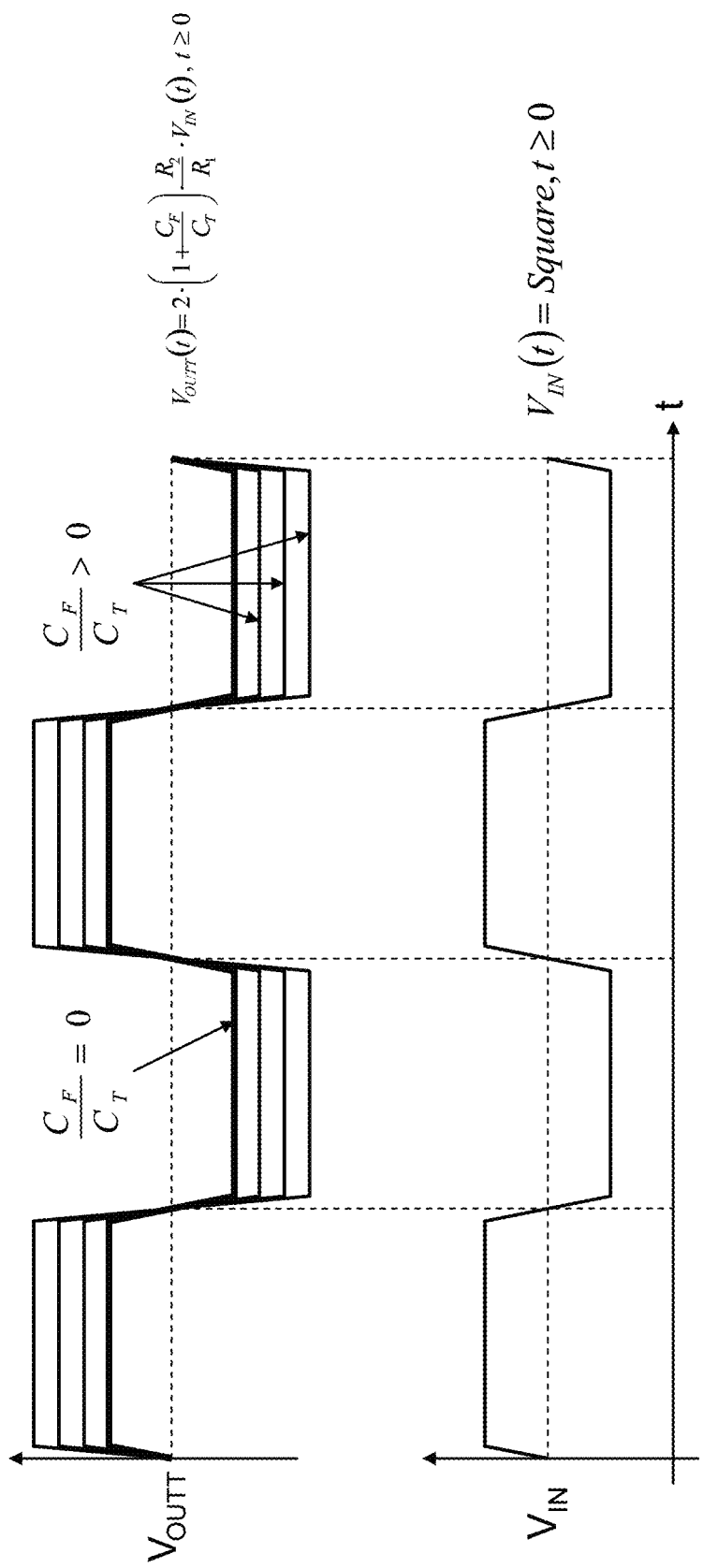
FIG. 9 shows charge conversion waveforms of the output signal $V_{OUTT}$ of the inducing capacitance detector shown in FIG. 1 for various capacitances $C_F$ and a square waveform of the supply voltage $V_{IN}$.

FIG. 8 and FIG. 9 show charge conversion waveforms of the output signal $V_{OUTT}$ of the inducing capacitance detector 700 illustrated in FIG. 7 for various capacitances $C_F$ induced by the finger touch and different waveforms of the supply voltage $V_{IN}$, a sinusoidal waveform (FIG. 8) and a square waveform (FIG. 9), respectively. The resulting waveforms satisfy the formula (2). If no contact is detected (i.e. $C_F$=0), the waveform of the output signal $V_{OuT}$ is the same as that of the supply voltage $V_{IN}$. However, if there is a contact of an object 790 with the inducing capacitance detector 100, the waveform of the output signal $V_{OUT}$ is $2\times(1+C_F/C_T)\times(R_2/R_1)$ times of the supply voltage $V_{IN}$. Therefore, the sensitivity of the inducing capacitance detector 700 can be enhanced by increasing the ratios $(C_F/C_T)$ and/or $(R_2/R_1)$.

Figure 10:
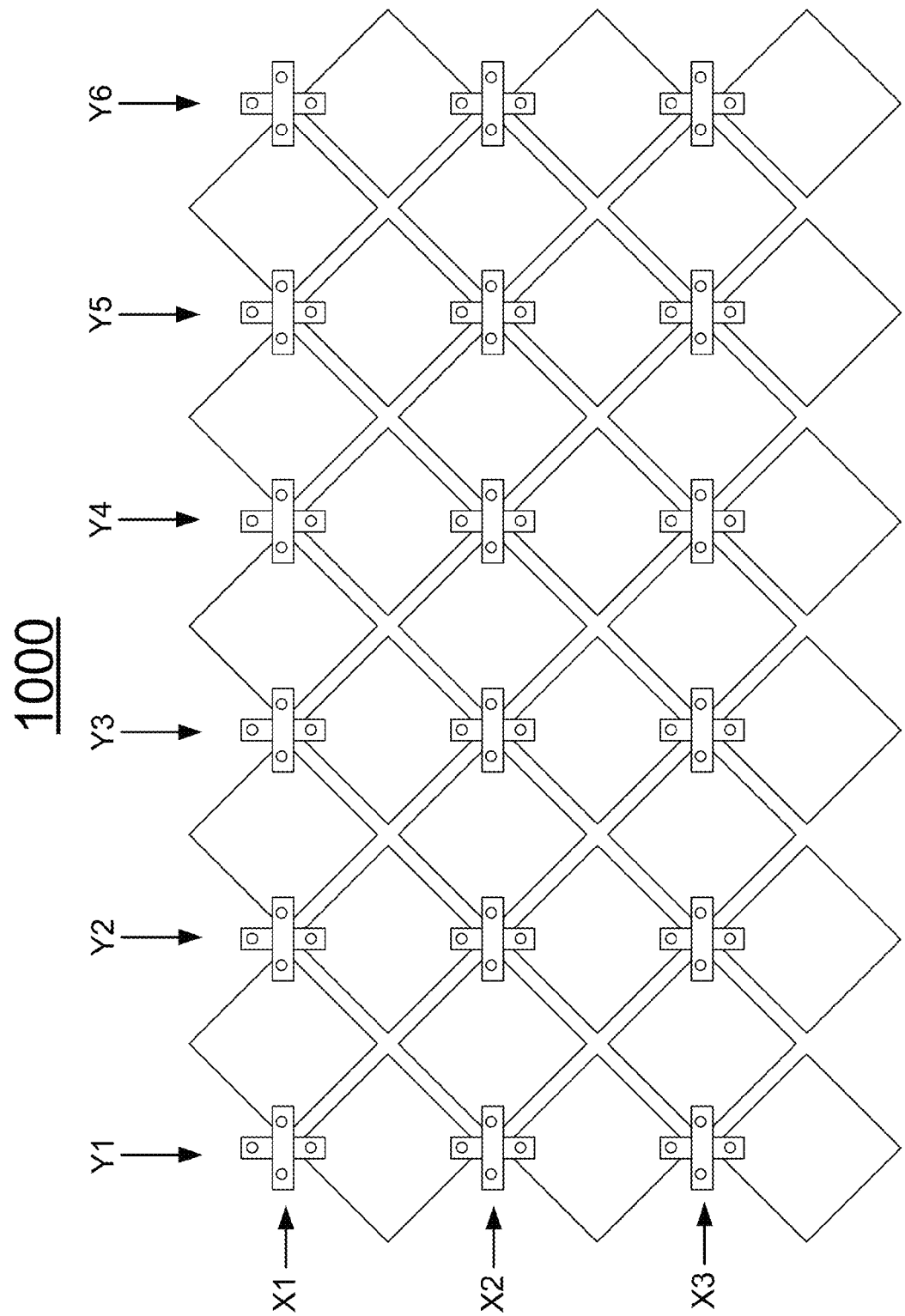
FIG. 10 shows schematically a capacitance sensor matrix pattern according to one embodiment of the present invention.

FIG. 10 shows schematically a capacitive position detector having a sensor matrix pattern 1000 according to one embodiment of the present invention. The sensor matrix 1000 has three rows X1-X3 of X-axis capacitance sensors, each having a diamond shaped electrode for sensing X-axis position information, and six columns Y1-Y6 of the Y-axis capacitance sensors, each having a diamond shaped electrode for sensing Y-axis position information. The X-axis capacitance sensors and the Y-axis capacitance sensors are alternately arranged in a 45° direction. Electrodes of each row of the X-axis capacitance sensors are electrically connected to each other in series. Electrodes of each column of the Y-axis capacitance sensors are electrically connected to each other in series.

Figure 11:
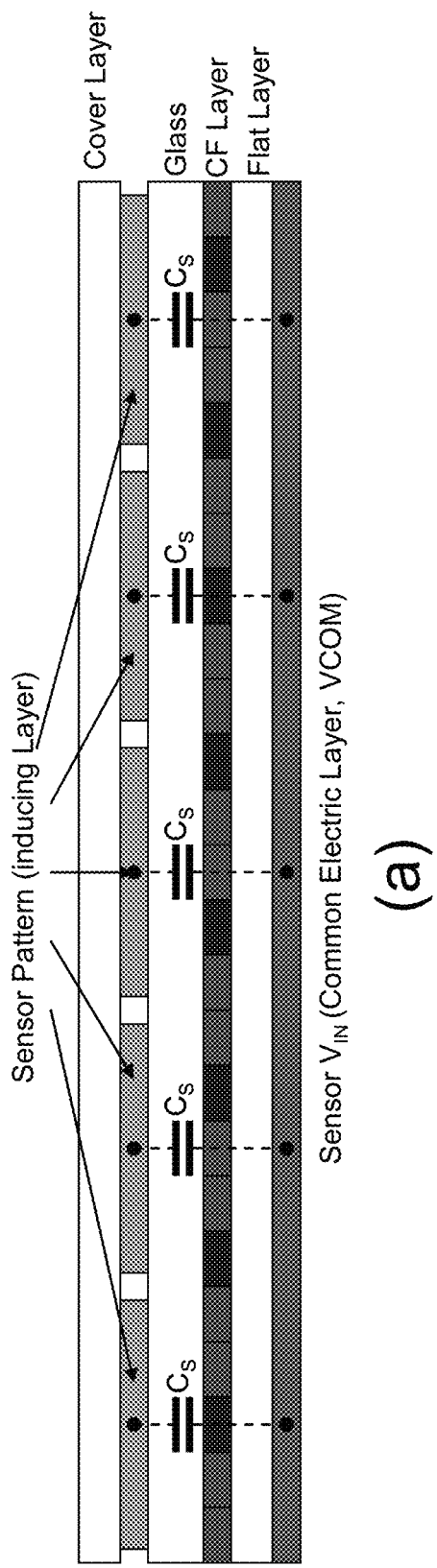
FIG. 11 shows schematically two types (a) and (b) of the layer structure of the capacitance sensor matrix according to embodiments of the present invention.
Figure 11:
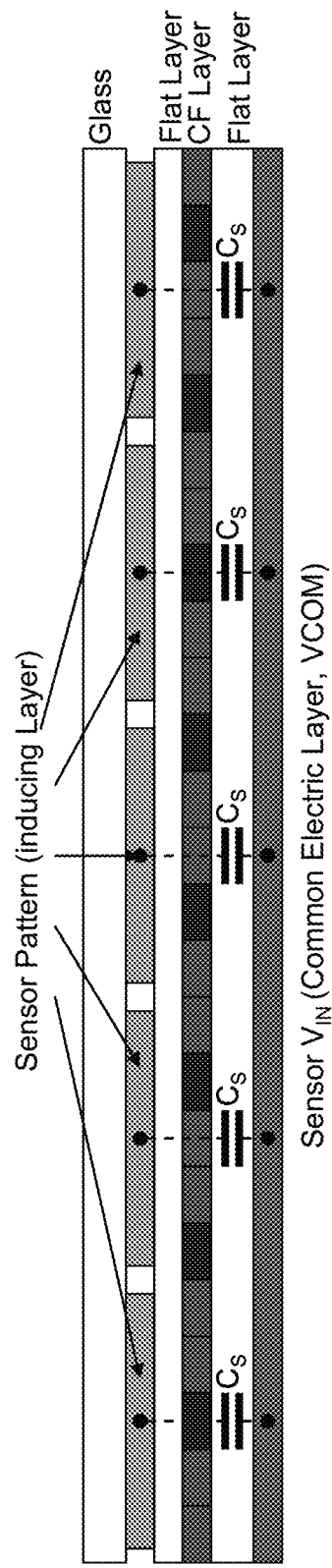

FIG. 11 shows schematically two layer structures of a capacitive position detector according to embodiments of the present invention. As shown in FIG. 11(a), the capacitive position detector has a common electrode layer, VCOM, a flat layer formed on the common electrode layer, a color filter layer formed on the flat layer, a glass layer formed on the color filter layer, an inducing layer (sensor pattern or matrix) formed on the glass layer, and a cover formed on the inducing layer. For such a structure, the capacitor $C_S$ is defined in the glass layer that is above the color filter layer.

As shown in FIG. 11(a), the capacitive position detector has a common electrode layer, VCOM, a first flat layer formed on the common electrode layer, a color filter layer formed on the first flat layer, a second flat layer formed on the color filter layer, an inducing layer (sensor pattern or matrix) formed on the second flat layer, a glass layer formed on the inducing layer. For this configuration, the capacitor $C_S$ is defined in the first flat layer that is below the color filter layer. The inducing layer can be patterned in a matrix such as the matrix pattern shown in FIG. 10.

Figure 12:
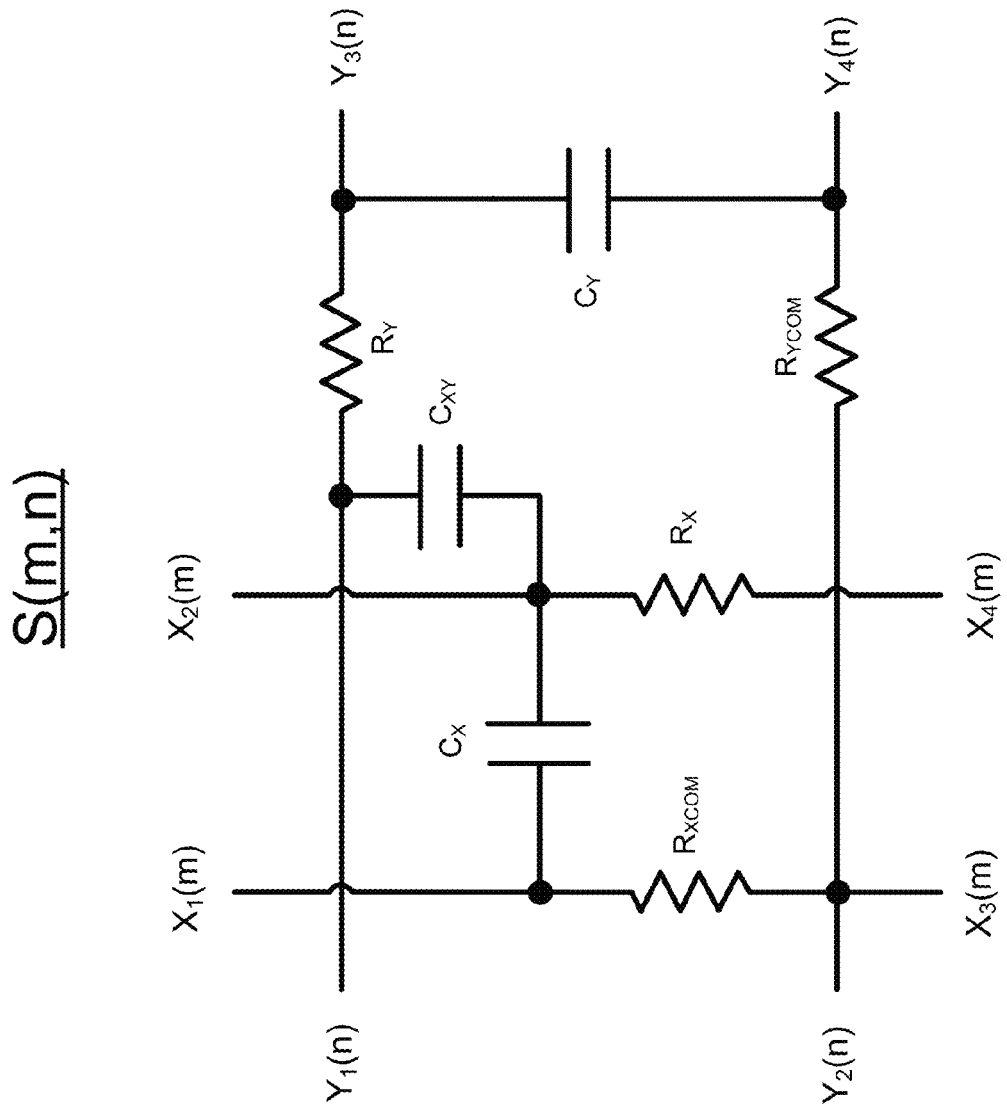
FIG. 12 shows a circuit diagram of a sensor loading model according to embodiments of the present invention.

Referring now to FIG. 12, a sensor loading model S(m, n) usable in the constitution of a sensor matrix of a capacitive position detection device is shown according to one embodiment of the present invention. As discussed below, m, n are variable integers indicating the location of the sensor loading model S(m, n) in the sensor matrix of the capacitive position detection device. The sensor loading model S(m, n) includes first, second, third and fourth X-axis terminals, $X_1(m)$, $X_2(m)$, $X_3(m)$ and $X_4(m)$, first, second, third and fourth four Y-axis terminals, $Y_1(n)$, $Y_2(n)$, $Y_3(n)$ and $Y_4(n)$, an X-axis sensor resistor, $R_X$, electrically connected between the first and third X-axis terminals $X_1(m)$ and $X_3(m)$, an X-axis VCOM resistor, $R_{XCOM}$, electrically connected between the second and fourth X-axis terminals $X_2(m)$ and $X_4(m)$, a Y-axis sensor resistor, $R_Y$, electrically connected between the first and third Y-axis terminals $Y_1(n)$ and $Y_3(n)$, a Y-axis VCOM resistor, $R_{YCOM}$, electrically connected between the second and fourth Y-axis terminals $Y_2(n)$ and $Y_4(n)$, an X-axis capacitor, $C_X$, electrically connected between the first and second X-axis terminals $X_1(m)$ and $X_2(m)$, a Y-axis capacitor, $C_Y$, electrically connected between the third and fourth Y-axis terminals $Y_3(n)$ and $Y_4(n)$, and a X-Y-axis cross capacitor, $C_{XY}$, electrically connected between the first Y-axis terminal $Y_1(n)$ and the second X-axis terminal $X_2(m)$.

Figure 13:
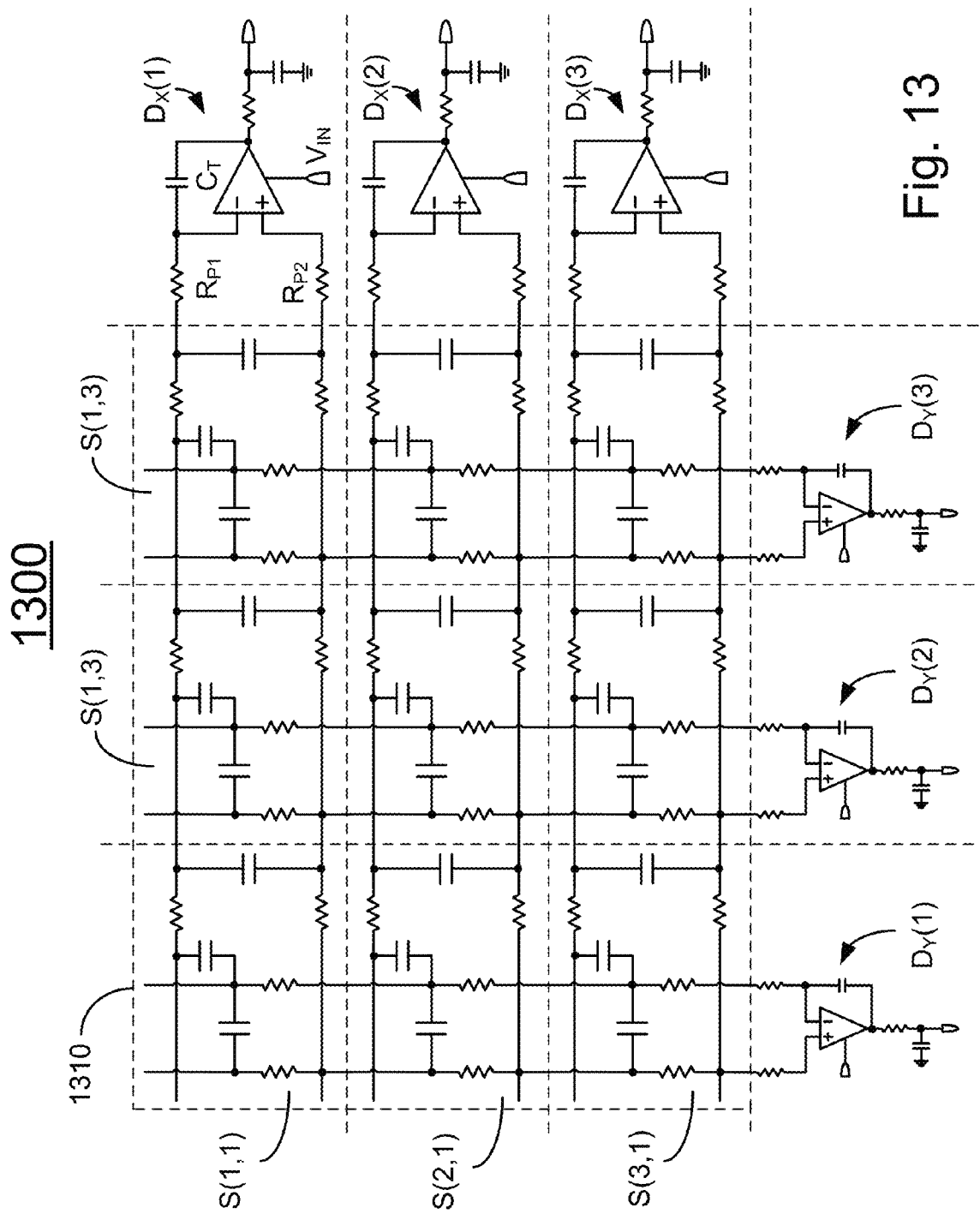
FIG. 13 shows a circuit diagram of a capacitive position detection device utilizing a plurality of sensor loading models according to one embodiment of the present invention.
Figure 14:
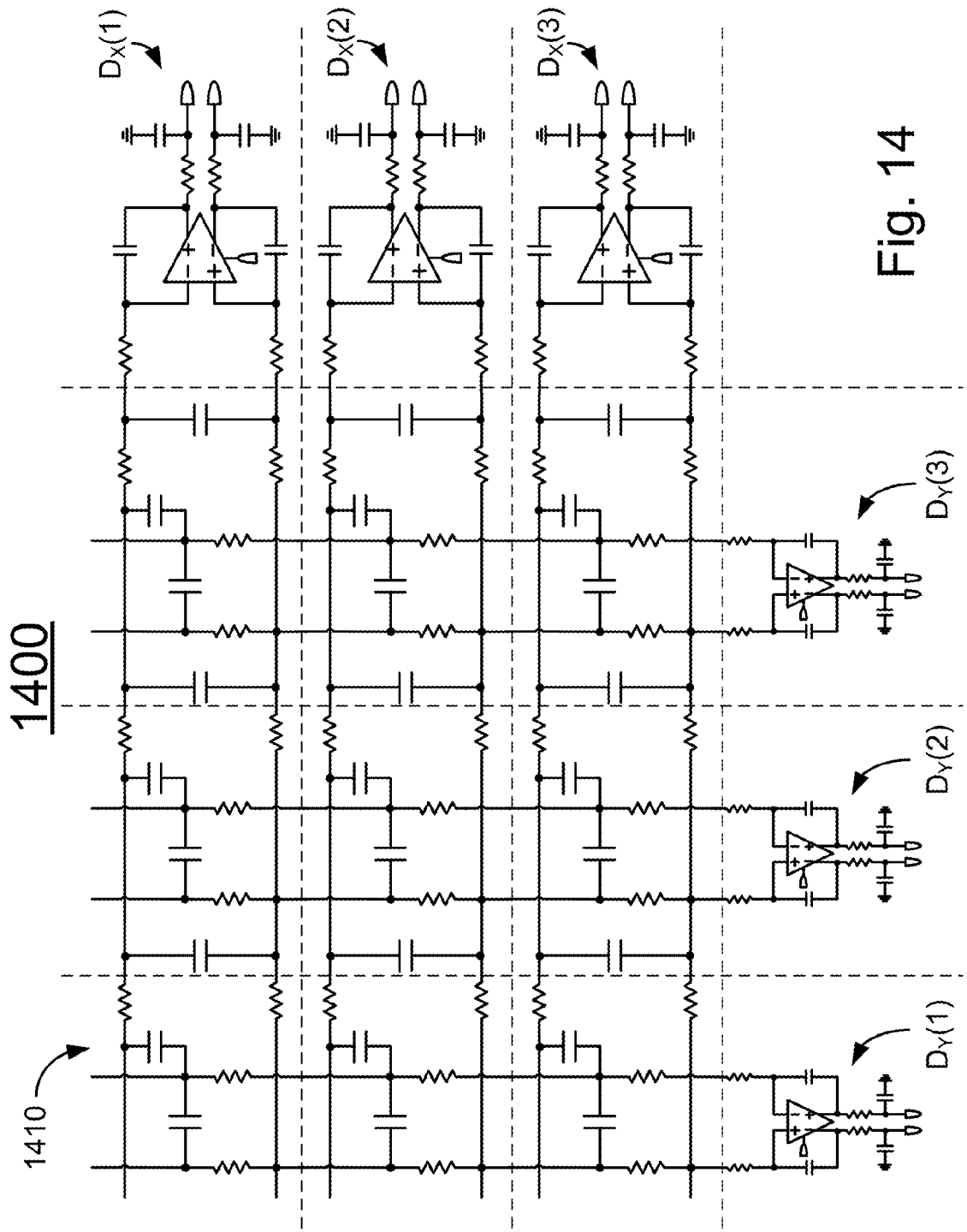
FIG. 14 shows a circuit diagram of a capacitive position detection device utilizing a plurality of sensor loading models according to another embodiment of the present invention.
Figure 15:
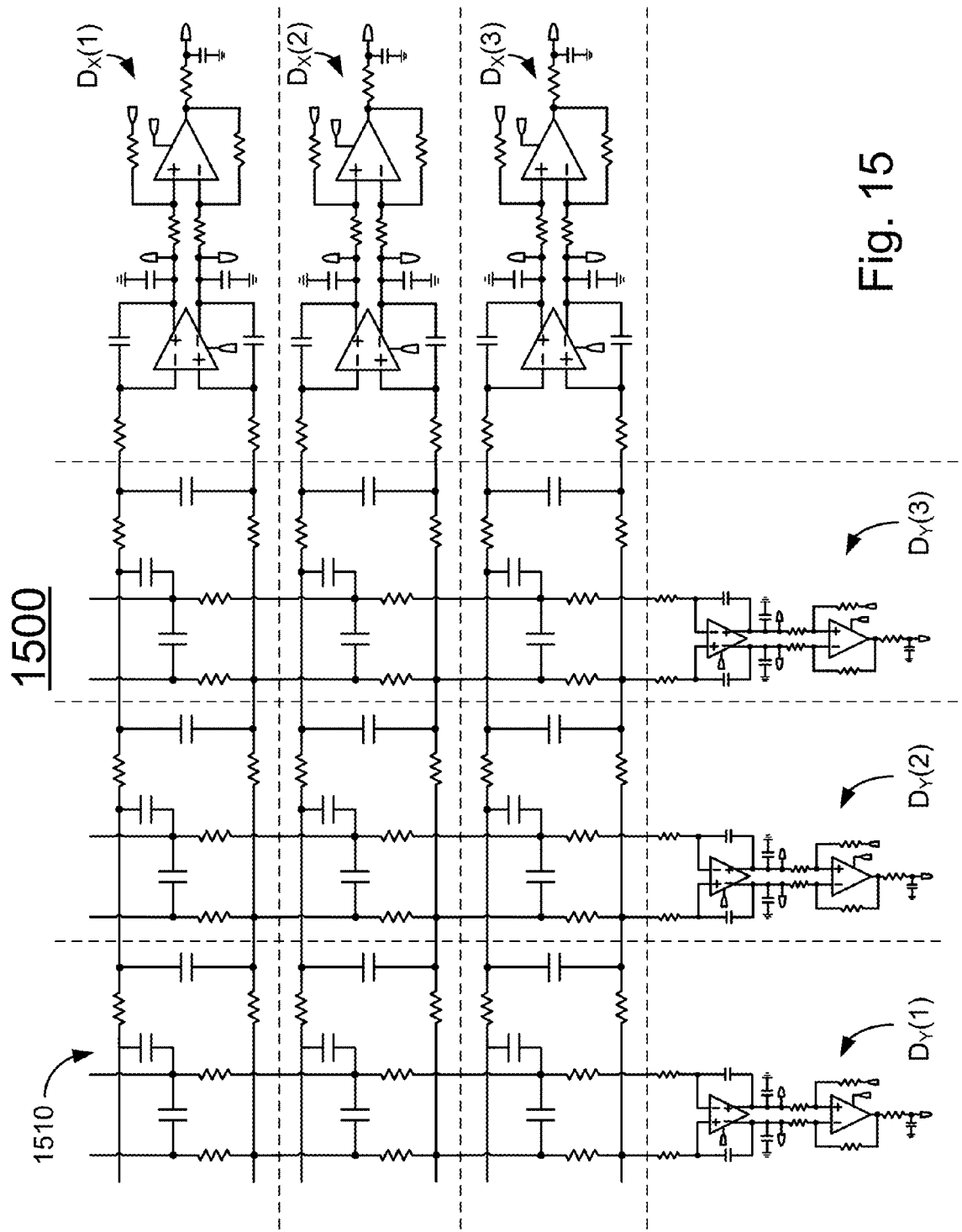
FIG. 15 shows a circuit diagram of a capacitive position detection device utilizing a plurality of sensor loading models according to yet another embodiment of the present invention.
Figure 16:
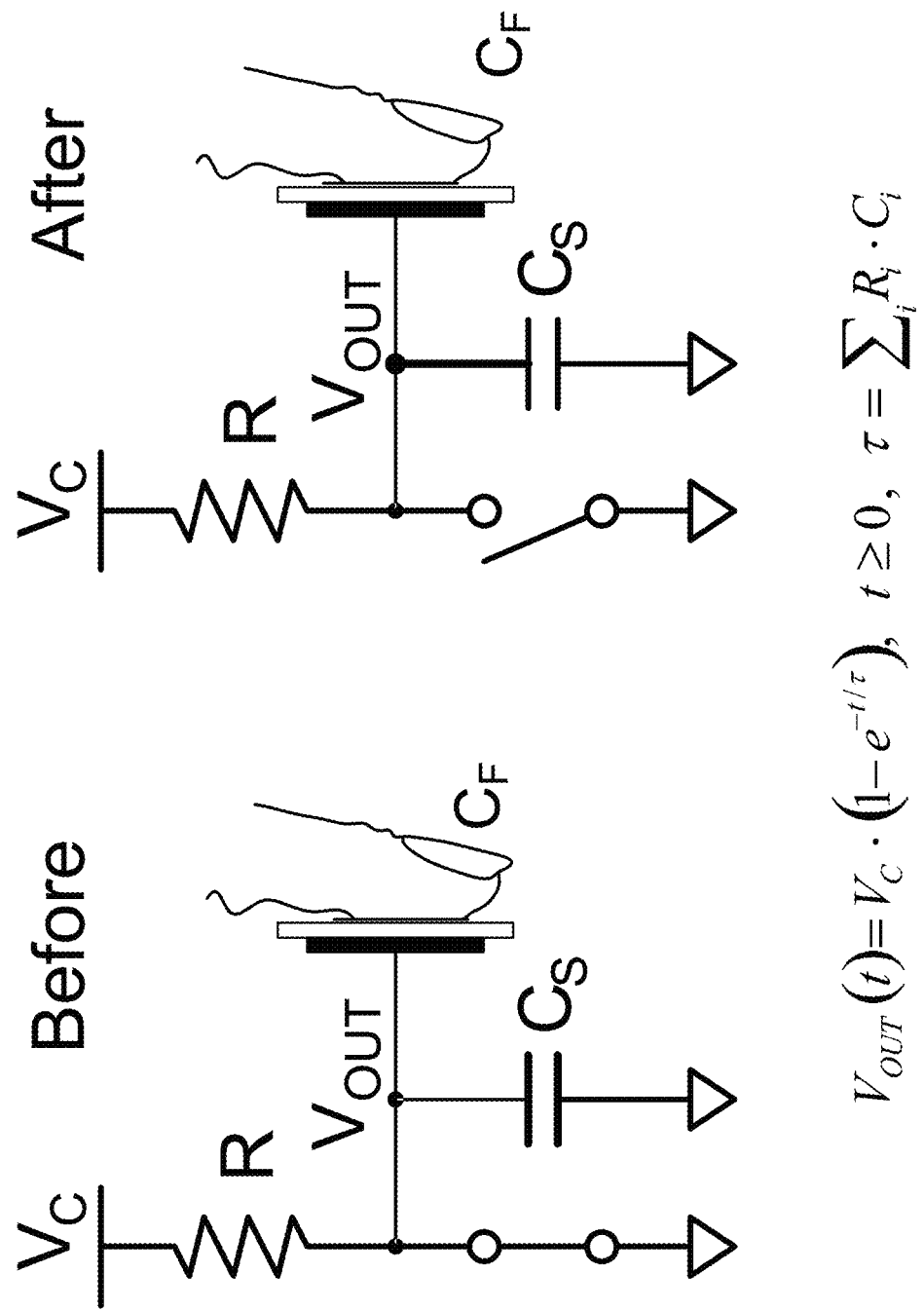
FIG. 16 shows a circuit diagram of a conventional inducing capacitance detector, (a) before and (b) after touching.
Figure 17:
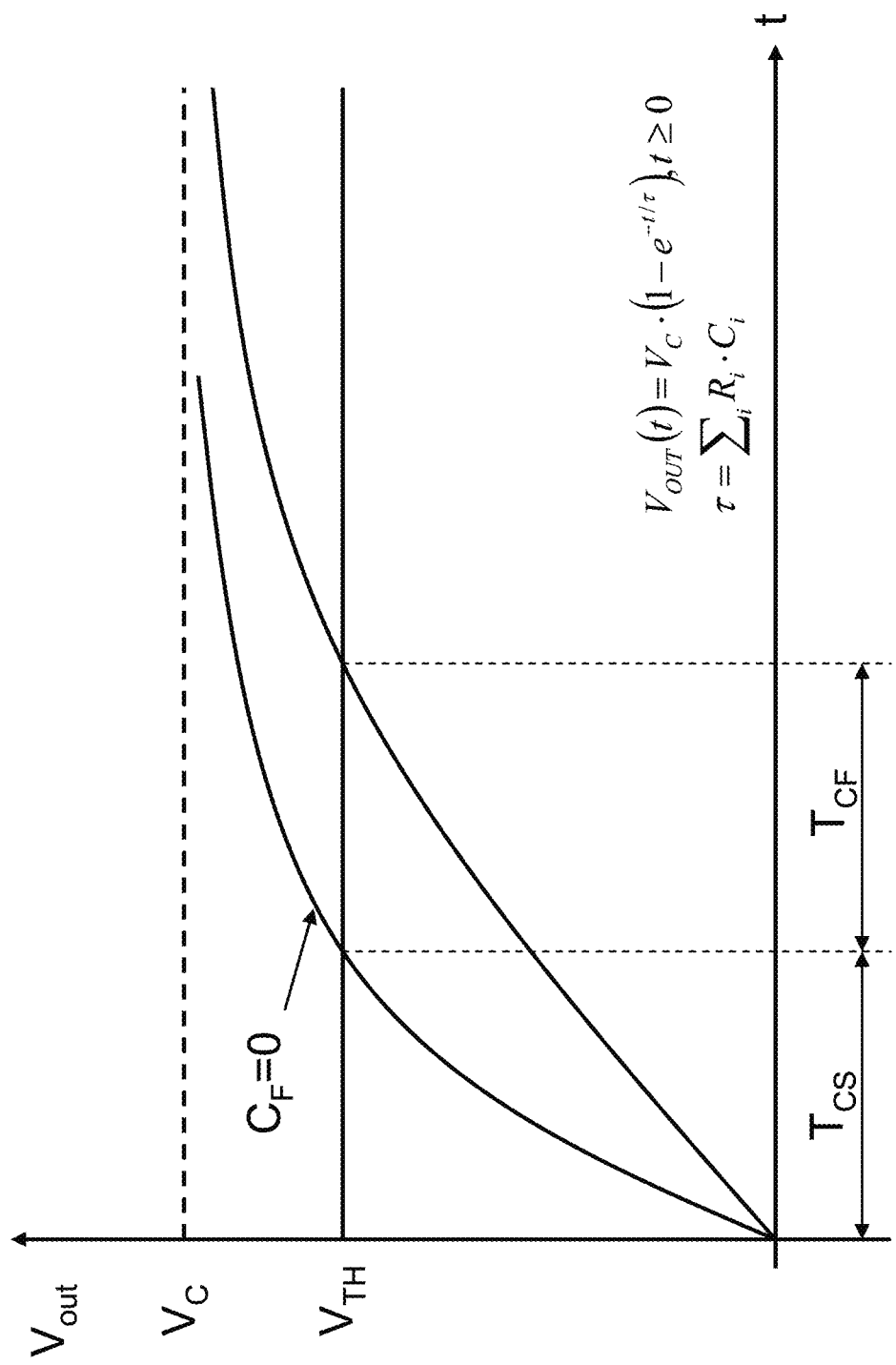
FIG. 17 shows the output signals of the conventional inducing capacitance detector shown in the FIG. 16.

FIGS. 13-15 respectively show capacitive position detection devices 1300, 1400 and 1500 where each utilizes a plurality of sensor loading models, {S(m, n)}, as shown in FIG. 12, according to various embodiments of the present invention. The plurality of sensor loading models {S(m, n)}, m=1, 2, . . . , M, n=1, 2, . . . , N, each of M and N being an positive integer, is spatially arranged in the form of matrix 1310 (1410 or 1510) having M rows and N columns. The plurality of sensor loading models {S(m, n)} is electrically coupled to each other for sensing a position of an object in contact with the capacitive sensor matrix 1310 (1410 or 1510). Specifically, for the n-th column, the first and second X-axis terminals $X_1(j+1)$ and $X_2(j+1)$ of the (j+1)-th row sensor loading model S(j+1, n) are electrically connected to the third and fourth X-axis terminals $X_3(j)$ and $X_4(j)$ of the j-th row sensor loading model S(j, n), j=1, 2, . . . , (M−1). For the m-th row, the first and second Y-axis terminals $Y_1(k+1)$ and $Y_2(k+1)$ of the (k+1)-th column sensor loading model S(m, k+1) are electrically connected to the third and fourth Y-axis terminals $Y_3(k)$ and $Y_4(k)$ of the k-th column sensor loading model S(m, k), k=1, 2, . . . , (N−1).

Each of the capacitive position detection devices 1300, 1400 and 1500 further has M X-axis detecting units, {$D_X$(m)}, m=1, 2, . . . , M, each X-axis detecting unit $D_X$(m) having first and second detecting inputs electrically connected to the third and fourth Y-axis terminals $Y_3$(N) and $Y_4$(N) of the m-th row and N-th column sensor loading model S(m, N), respectively, and N Y-axis detecting units, {$D_Y$(n)}, n=1, 2, . . . , N, each Y-axis detecting unit $D_Y$(n) having first and second detecting inputs electrically connected to the third and fourth X-axis terminals $X_3(M)$ and $X_4(M)$ of the M-th row and n-th column sensor loading model $S(M, n)$, respectively.

For the purpose of illustration of the present invention, M=3 is chosen in this exemplary embodiment of FIG. 13. It is obvious that any number of capacitors can be utilized to practice the present invention.

Preferably, each of the X-axis detecting units $D_X(1)$, $D_X(2)$ and $D_X(3)$ and the Y-axis detecting units $D_Y(1)$, $D_Y(2)$ and $D_Y(3)$ is identical to each other. The following description is focused on the X-axis detecting unit $D_X(1)$, $D_X(2)$ or $D_X(3)$ only.

In one embodiment, as shown in FIG. 13, the X-axis detecting unit $D_X(1)$, $D_X(2)$ or $D_X(3)$ includes an operational amplifier having an inverting input, a non-inverting input terminal and an output terminal for outputting an output signal. The operational amplifier has a third input terminal electrically connected to a supply voltage, $V_{IN}$. The X-axis detecting unit $D_X(1)$, $D_X(2)$ or $D_X(3)$ also includes a feedback capacitor $C_T$ is electrically connected between the first detecting input and the output terminal of the operational amplifier, and two resistors $R_{P1}$ and $R_{P2}$, where the resistor $R_{P1}$ is electrically connected between the first detecting input and the inverting input terminal of the operational amplifier, and the resistor $R_{P2}$ is electrically connected between the second detecting input and the non-inverting input terminal of the operational amplifier, respectively.

In another embodiment, as shown in FIG. 14, the X-axis detecting unit $D_X(1)$, $D_X(2)$ or $D_X(3)$ includes a fully differential operational amplifier, two feedback capacitors $C_T$, and two resistors $R_{P1}$ and $R_{P2}$. The fully differential operational amplifier has an inverting input, a non-inverting input, a third input terminal electrically connected to a supply voltage, a first output terminal for outputting a first output signal, and a second output terminal for outputting a second output signal. The first feedback capacitor $C_T$ is electrically connected between the inventing input terminal and the first output terminal of the fully differential operational amplifier, and a second feedback capacitor $C_T$ is electrically connected between the non-inventing input terminal and the second output terminal of the operational amplifier. The resistor $R_{P1}$ is electrically connected between the first detecting input and the inverting input terminal of the fully differential operational amplifier, and the resistor $R_{P2}$ is electrically connected between the second detecting input and the non-inverting input terminal of the fully differential operational amplifier, respectively.

In yet another embodiment, as shown in FIG. 15, a fully differential operational amplifier and a single-ended operational amplifier are utilized in the X-axis detecting unit $D_X(1)$, $D_X(2)$ or $D_X(3)$, which its configuration is similar to the detecting unit shown in FIG. 7.

For such a capacitive position detection device 1300, 1400 or 1500, when the finger or the like touches on the capacitive sensor matrix 1310, 1410 or 1510 at a location to be detected, electronic charges are induced therein. The charges can be simultaneously detected by a corresponding X-axis detecting unit $D_X(1)$, $D_X(2)$ or $D_X(3)$, and a corresponding Y-axis detecting unit $D_Y(1)$, $D_Y(2)$ or $D_Y(3)$, thereby determining the touch location in the capacitive sensor matrix 1310, 1410 or 1510. As discussed above, the output signals are independent of $R_X$, $R_Y$, $R_{XCOM}$, $R_{YCOM}$, $C_X$, $C_Y$, and $C_{XY}$, of a sensor loading model $S(m, n)$. Accordingly, the sensitivity of the capacitive position detection device can be improved substantially according to the present invention.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope.

Accordingly, the scope of the present invention is defined by the appended claims rather than the foregoing description and the exemplary embodiments described therein.

What is claimed is:

1. A capacitive position detector, comprising:
   (a) an input for providing a supply voltage, $V_{IN}$;
   (b) a capacitive sensor array, comprising:
      (i) a first sensing output;
      (ii) a second sensing output;
      (iii) a plurality of capacitors, $\{C(m)\}$, m =1, 2, ..., M, M being a positive integer, each capacitor $C(m)$ having a first electrode and a second electrode;
      (iv) a plurality of sensor resistors, $\{R_S(m)\}$, each sensor resistor $R_S(m)$ having a first terminal and a second terminal, wherein the first and second terminals of the j-th sensor resistor $R_S(j)$ are electrically connected to the first electrodes of the j-th capacitor $C(j)$ and the (j+1)-th capacitor $C(j+1)$, respectively, j =1, 2, ..., (M−1), and the first and second terminals of the M-th sensor resistor $R_S(M)$ are electrically connected to the first electrode of the M-th capacitor $C(M)$ and the first sensing output, respectively; and
      (v) a plurality of reference resistors, $\{R_{COM}(m)\}$, each reference resistor $R_{COM}(m)$ having a first terminal and a second terminal, wherein the first and second terminals of the j-th reference resistor $R_{COM}(j)$ are electrically connected to the second electrodes of the j-th capacitor $C(j)$ and the (j+1)-th capacitor $C(j+1)$, respectively, and the first and second terminals of the M-th reference resistor $R_{COM}(M)$ are electrically connected to the second electrode of the M-th capacitor $C(M)$ and the second sensing output, respectively; and
   (c) an operational amplifier having an inverting input terminal electrically coupled to the first sensing output of the capacitive sensor array, and a non-inverting input terminal, and an output terminal, wherein the non-inverting input terminal and the second sensing output of the capacitive sensor array are electrically connected in common to the input, and wherein an output terminal is adapted for outputting an output signal, $V_{OUT}$; and
   (d) a feedback capacitor $C_T$ electrically connected between the inventing input terminal and the output terminal of the operational amplifier.

2. The inducing capacitance detector of claim 1, wherein each of the plurality of capacitors, $\{C(m)\}$ has a capacitance, $C_S$.

3. The inducing capacitance detector of claim 1, wherein each of the plurality of the sensor resistors $\{R_S(m)\}$ has a resistance $R_S$, wherein each of the plurality of reference resistors $\{R_{COM}(m)\}$ has a resistance $R_{COM}$, and wherein $R_S$ and $R_{COM}$ are identical or different.

4. The inducing capacitance detector of claim 1, further comprising a switch $S_R$ electrically connected between the inventing input terminal and the output terminal of the operational amplifier.

5. The inducing capacitance detector of claim 1, further comprising two resistors $R_{P1}$ and $R_{P2}$, wherein the resistor $R_{P1}$ is electrically connected between the first detecting input and the inverting input terminal of the operational amplifier, and the resistor $R_{P2}$ is electrically connected between the second detecting input and the non-inverting input terminal of the operational amplifier, respectively.

6. The inducing capacitance detector of claim 1, wherein the output signal at a given time t, $V_{OUT}(t)$, satisfies the following formula:

$$V_{OUT}(t) = \left(1 + \frac{C_F}{C_T}\right) \cdot V_{IN}(t), t \geq 0,$$

wherein $V_{IN}(t)$ is the supply voltage received from the input, $C_F$ is an inducing capacitance between the capacitive sensing array and an object, and $C_T$ is the capacitance of the feedback capacitor.

7. A capacitive position detection device, comprising:
 (a) a plurality of sensor loading models, $\{S(m, n)\}$, m =1, 2, ..., M, n =1, 2, ..., N, each of M and N being an positive integer, spatially arranged in the form of matrix having M rows and N columns, each sensor loading model S(m, n) comprises:
  (i) first, second, third and fourth X-axis terminals, $X_1(m)$, $X_2(m)$, $X_3(m)$ and $X_4(m)$;
  (ii) first, second, third and fourth four Y-axis terminals, $Y_1(n)$, $Y_2(n)$, $Y_3(n)$ and $Y_4(n)$;
  (iii) an X-axis capacitor, $C_X$, having a first electrode electrically connected to the first X-axis terminals $X_1(m)$ and a second electrode electrically connected to the second X-axis terminals $X_2(m)$;
  (iv) a Y-axis capacitor, $C_Y$, having a first electrode electrically connected to the third Y-axis terminals $Y_3(n)$ and a second electrode electrically connected to the fourth Y-axis terminals $Y_4(n)$; and
  (v) a X-Y-axis cross capacitor, $C_{XY}$, having a first electrode electrically connected to the second electrode of the X-axis capacitor $C_X$ and a second electrode electrically connected to the first Y-axis terminal $Y_1(n)$;
  (vi) an X-axis sensor resistor, $R_X$, having a first terminal electrically connected to the second electrode of the X-axis capacitor $C_X$ and a second terminal electrically connected to the fourth X-axis terminals $X_4(m)$;
  (vii) an X-axis VCOM resistor, $R_{XCOM}$, having a first terminal electrically connected to the first electrode of the X-axis capacitor $C_X$ and a second terminal electrically connected to the third X-axis terminals $X_3(m)$ that is electrically connected to the second Y-axis terminals $Y_2(n)$;
  (viii) a Y-axis sensor resistor, $R_Y$, having a first terminal electrically connected to the second electrode of the X-Y-axis cross capacitor $C_{XY}$ and a second terminal electrically connected to the first electrode of the Y-axis capacitor $C_Y$;
  (ix) a Y-axis VCOM resistor, $R_{YCOM}$, having a first terminal electrically connected to the second Y-axis terminals $Y_2(n)$ and a second terminal electrically connected to the second electrode of the Y-axis capacitor $C_Y$;
  wherein for the n-th column, the first and second X-axis terminals $X_1(j+1)$ and $X_2(j+1)$ of the (j+1)-th row sensor loading model S(j+1, n) are electrically connected to the third and fourth X-axis terminals $X_3(j)$ and $X_4(j)$ of the j-th row sensor loading model S(j, n), respectively, j =1, 2, ..., (M−1); and
  wherein for the m-th row, the first and second Y-axis terminals $Y_1(k+1)$ and $Y_2(k+1)$ of the (k+1)-th column sensor loading model S(m, k+1) are electrically connected to the third and fourth Y-axis terminals $Y_3(k)$ and $Y_4(k)$ of the k-th column sensor loading model S(m, k), respectively, k =1, 2, ..., (N−1); and
 (b) M X-axis detecting units, $\{D_X(m)\}$, m =1, 2, ..., M, each X-axis detecting unit $D_X(m)$ having first and second detecting inputs electrically connected to the third and fourth Y-axis terminals $Y_3(N)$ and $Y_4(N)$ of the m-th row and N-th column sensor loading model S(m, N), respectively;
 (c) N Y-axis detecting units, $\{D_Y(n)\}$, n =1, 2, ..., N, each Y-axis detecting unit $D_Y(n)$ having first and second detecting inputs electrically connected to the third and fourth X-axis terminals $X_3(M)$ and $X_4(M)$ of the M-th row and n-th column sensor loading model S(M, n), respectively.

8. The capacitive position detection device of claim 7, wherein each X-axis detecting unit $D_X(m)$ and each Y-axis detecting unit $D_Y(n)$ are identical to each other.

9. The capacitive position detection device of claim 8, wherein each X-axis detecting unit $D_X(m)$ comprises:
 (a) an operational amplifier having an inverting input terminal electrically coupled to the first detecting input, a non-inverting input terminal electrically coupled to the second detecting input and an output terminal for outputting an output signal; and
 (b) a feedback capacitor $C_T$ electrically connected between the first detecting input and the output terminal of the operational amplifier.

10. The capacitive position detection device of claim 9, wherein the operational amplifier has a third input terminal electrically connected to a supply voltage.

11. The capacitive position detection device of claim 9, wherein each X-axis detecting unit $D_X(m)$ further comprises two resistors $R_{P1}$ and $R_{P2}$, wherein the resistor $R_{P1}$ is electrically connected between the first detecting input and the inverting input terminal of the operational amplifier, and the resistor $R_{P2}$ is electrically connected between the second detecting input and the non-inverting input terminal of the operational amplifier, respectively.

* * * * *